United States Patent
Smeets et al.

(10) Patent No.: US 7,861,097 B2
(45) Date of Patent: Dec. 28, 2010

(54) SECURE IMPLEMENTATION AND UTILIZATION OF DEVICE-SPECIFIC SECURITY DATA

(75) Inventors: Bernard Smeets, Dalby (SE); Goran Selander, Stockholm (SE); Per-Olof Nerbrant, Osterkar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 969 days.

(21) Appl. No.: 10/533,120

(22) PCT Filed: Oct. 27, 2003

(86) PCT No.: PCT/SE03/01660

§ 371 (c)(1),
(2), (4) Date: Sep. 19, 2005

(87) PCT Pub. No.: WO2004/040397

PCT Pub. Date: May 13, 2004

(65) Prior Publication Data

US 2006/0101288 A1    May 11, 2006

Related U.S. Application Data

(60) Provisional application No. 60/422,498, filed on Oct. 31, 2002.

(51) Int. Cl.
*G06F 12/14* (2006.01)
*G06F 7/04* (2006.01)
(52) U.S. Cl. .............. 713/194; 726/33; 726/34
(58) Field of Classification Search ........... 713/194; 726/33, 34
See application file for complete search history.

(56) References Cited

U.S. PATENT DOCUMENTS 4,748,668 A   5/1988   Shamir et al.

(Continued)

FOREIGN PATENT DOCUMENTS

EP   0750410   * 12/1996

(Continued)

OTHER PUBLICATIONS

"Digital Signature Cards Range"—Secure smart cards for doing electronic business; GEMPLUS; Oct. 27, 2003; http://www.gemplus.com/products/dig_sign_cards_range.

(Continued)

*Primary Examiner*—Michael Pyzocha
(74) *Attorney, Agent, or Firm*—Nixon & Vanderhye P.C.

(57) ABSTRACT

A tamper-resistant electronic circuit is configured for implementation in a device. The electronic circuit securely implements and utilizes device-specific security data during operation in the device, and is basically provided with a tamper-resistantly stored secret not accessible over an external circuit interface. The electronic circuit is also provided with functionality for performing cryptographic processing at least partly in response to the stored secret to generate an instance of device-specific security data that is internally confined within said electronic circuit during usage of the device. The electronic circuit is further configured for performing one or more security-related operations or algorithms in response to the internally confined device-specific security data. In this way, secure implementation and utilization device-specific security data for security purposes can be effectively accomplished. The security is uncompromised since the stored secret is never available outside the electronic circuit, and the device-specific security data is internally confined within the circuit during usage or operation of the device.

27 Claims, 16 Drawing Sheets

U.S. PATENT DOCUMENTS

| | | | | |
|---|---|---|---|---|
| 5,386,468 | A | * | 1/1995 | Akiyama et al. ............ 380/249 |
| 5,422,953 | A | * | 6/1995 | Fischer ....................... 713/172 |
| 5,537,474 | A | | 7/1996 | Brown et al. |
| 5,623,637 | A | * | 4/1997 | Jones et al. .................. 711/164 |
| 5,668,878 | A | * | 9/1997 | Brands ......................... 380/30 |
| 5,740,403 | A | * | 4/1998 | Kowalski ..................... 711/164 |
| 5,757,918 | A | | 5/1998 | Hopkins |
| 6,141,756 | A | | 10/2000 | Bright et al. |
| 6,470,454 | B1 | * | 10/2002 | Challener et al. ............. 726/17 |
| 6,687,375 | B1 | * | 2/2004 | Matyas et al. ................. 380/45 |
| 6,711,400 | B1 | | 3/2004 | Aura |
| 7,039,191 | B2 | * | 5/2006 | Shinohara ................... 380/277 |
| 7,047,416 | B2 | * | 5/2006 | Wheeler et al. ............. 713/182 |
| 7,149,308 | B1 | * | 12/2006 | Fruehauf et al. ............. 380/44 |
| 2001/0054147 | A1 | * | 12/2001 | Richards ..................... 713/172 |
| 2002/0044648 | A1 | * | 4/2002 | Arazi .......................... 380/30 |
| 2002/0099948 | A1 | * | 7/2002 | Kocher et al. ............... 713/194 |
| 2003/0023871 | A1 | * | 1/2003 | Gnanasabapathy et al. .. 713/200 |
| 2003/0028771 | A1 | * | 2/2003 | Kocher et al. ............... 713/172 |
| 2003/0033537 | A1 | * | 2/2003 | Fujimoto et al. ............ 713/193 |
| 2003/0053629 | A1 | * | 3/2003 | Knapen ...................... 380/277 |
| 2003/0056100 | A1 | * | 3/2003 | Beatson ...................... 713/176 |
| 2003/0159067 | A1 | | 8/2003 | Stirbu |
| 2007/0189534 | A1 | * | 8/2007 | Wood et al. ................. 380/255 |

FOREIGN PATENT DOCUMENTS

| | | | |
|---|---|---|---|
| EP | 0753816 | | 1/1997 |
| EP | 1081891 | A2 * | 3/2001 |
| EP | 1 168 870 | | 1/2002 |
| GB | 0129339-8 | | 12/2002 |
| GB | 2 376 392 | | 5/2003 |
| WO | WO 9516238 | * | 6/1995 |
| WO | WO 00/48416 | | 8/2000 |
| WO | WO 0077974 | A1 * | 12/2000 |
| WO | WO 02/084980 | | 10/2002 |
| WO | WO 03/056863 | | 7/2003 |

OTHER PUBLICATIONS

Stacy Cannady and Thomas H. Stockton; "Easing the Pain" —How PKI can reduce the risks associated with e-business transactions; IBM; Feb. 1, 2001; http://www-106.ibm.com/developerworks/library/s-pain.html.

"The Mechanisms of Data Security;" Sep. 2, 2003; http://www.cardsnowindia.com/news/security1.htm.

"Security in an open world;" SkillTeam; Sep. 2, 2003; http://www.common.lu.

Krawczyk et al.; "HMAC: Keyed-Hashing for Message Authentication;" IETF; RFC 2104; Feb. 1997.

Menezes, van Oorschot, and Vanstone; "Handbook of Applied Cryptography;" Chapter 1 Overview of Cryptography; Chapter 9 Hash Functions and Data Integrity; Chapter 12 Key Establishment Protocols; CRC Press, 1997.

Wireless Identify Module, Part: Security. Jul. 12, 2001, WAP-260-WIM-20010712-A, Wireless Application Protocol Forum.

Digital Cellular Telecommunications System (Phase 2+); Subscriber Identify Modules (SIM); Functional Characteristics (GSM 02.17 version 6.0.0 Release 1997), ETSI TS 100 922 V6.0.0 (Nov. 1998), p. 1-13.

H. Haverinen et al., Extensible Authentication Protocol Method for Global System for Mobile Communications (GSM) Subscriber Identify Modules (EAP-SIM), Network Working Group, Jan. 2006, Section 3, p. 8-10 and Section 12, p. 66-74.

Secure Hash Standard, FIPS Pub 180-1, May 11, 1993, pp. 1-17.

J. Arkko et al., Extensible Authentication Protocol Method for $3^{rd}$ Generation Authentication and Key Agreement (EAP-AKA), Network Working Group, Jan. 2006, Section 3, pp. 9-15 and Section 7, pp. 43-45.

3GPP TS 11.11 V8.14.0 (Jun. 2007); Clause 7, p. 28-29, Clause 8.16 and 8.19, p. 36, Clause 9.2.16 and 9.2.20, p. 46-47, Clause 11.4, p. 120-1222, Claus 11.6, p. 128-131.

3GPP TS 11.14 V8.18.0 (Jun. 2007), p. 1-57.

3GPP TS 31.111 V8.4.0 (Jan. 2009), p. 1-96.

3 GPP TS 03.19 V8.5.0 (Sep. 2002), p. 1-34.

3GPP TS 03.48 V8.9.0 (Jun. 2005), p. 1-34.

J. Arkko et al., Mikey: Multimeda Internet KEYing, Network Working Group, Aug. 2004, Section 2-4, p. 7-26.

Sarvar Patel, Analysis of EAP-SIM Session Key Agreement, May 29, 2003, p. 1-4.

A. Niemi et al., IETF RFC 3310, Hypertext Transfer Protocol (HTTP) Digest Authentication Using Authentication and key Agreement (AKA); Network Working Group, Sep. 2002., p. Section 2-3, p. 4-8.

3GPP TSG SA WG3 Security, Enhanced Security for A/Gb, Jul. 15-18, 2003, p. 1-5.

A. Menezes et al., Handbook of Applied Cryptography, CRC Press, Aug. 2001, p. 515-520.

Summary of Japanese Official Action, Feb. 19, 2010, in corresponding Japanese patent application No. 2004-548211.

Aoki et al., "Cryptography Authentication Hardware Accelerator", NTT Technical Journal, The Telecommunication Association (TTA) vol. 11, No. 3, pp. 17-22, Mar. 5, 1999.

Office Action mailed May 11, 2010 in co-pending U.S. Appl. No. 10/530,293.

* cited by examiner

SECURE IMPLEMENTATION AND UTILIZATION OF DEVICE-SPECIFIC SECURITY DATA

This application is the US national phase of international application PCT/SE2003/001660 filed 27 Oct. 2003 which designated the U.S. and claims benefit of U.S. Provisional Application 60/422,498, filed 31 Oct. 2002, the entire contents of each of which are hereby incorporated by reference.

TECHNICAL FIELD

The technical field generally relates to management, implementation and utilization of device-specific security data for various purposes, and more particularly to secure and efficient procedures for providing devices with such device-specific security data.

BACKGROUND

There is a general need for implementing and utilizing device-specific security data in a wide variety of different devices such as mobile telephones, personal computers, cameras, audio devices, servers, base stations and firewalls. Device-specific security data can be used for various purposes, including management of security issues in relation to communication over insecure networks, content-marking of digital content and so forth.

To facilitate the understanding of a rationale behind the present invention, it may be helpful to think of the manufacturing process of devices in large volumes. In particular, it may for example be useful to consider a device manufacturer, with limited trust in any third party (in particular third party chip manufacturers), that needs to produce devices containing tamper-resistantly protected and per-device unique cryptographic keys and/or other security data to a low cost.

In network communication, for example, data security is often based on some sort of security data, e.g. a cryptographic key, which is used to establish data confidentiality, data integrity, authentication, authorization, non-repudiation and/or other security services. With the rapid development of Internet, packet data telecommunications networks and other communications networks, it has become increasingly more important to be able to provide proper data security such as protecting messages exchanged between nodes and/or devices in the network. For simplicity, any entity that participates in such communication will be referred to as a network device, and examples include mobile telephones, personal computers, security gateways, firewalls, radio base stations and so forth.

There are several difficulties in securely and cost efficiently manufacturing devices with security data that can later be used e.g. for security issues in connection with network communication:

To install or implement device-specific security data, different for each device. This may require entirely new manufacturing processes for some device components and thus become costly and/or inefficient.

To place the security data in a location within the device such that it cannot be compromised or manipulated by unauthorized parties.

To ensure that the security data is protected from unauthorized parties during the entire manufacturing process of the device. In particular if untrusted parties are involved during manufacturing, additional security management may be necessary.

To securely manage information, related to the security data, that is needed for an authorized party to later be able to provide data security in relation to device e.g. setting up a secure connection with the device. For example, if the device security data is a shared secret key in a cryptographic protocol, such as an authentication and/or encryption protocol, the same key must be available, and only available, for the authorized communications partner(s) that should be able to set up the secure connection with the device.

For example, many communication systems of today, including mobile communication systems, paging systems, as well as wireless and wireline data networks, employ authentication and encryption procedures for the purpose of improving system security and robustness. The problem of establishing secure and robust communication is encountered in many technical applications, ranging from general network communication to more specific applications such as Digital Rights Management (DRM).

In general, there are two solutions for storing security data in a device, either on a chip or Integrated Circuit (IC) or in some sort of programmable memory, e.g. a PROM, keeping in mind that data stored on an IC is generally more protected.

In reference [1], a master key is stored in the EEPROM of a smart card, and used for encrypting sensitive information to be stored in a relatively less secure storage medium.

Reference [2] discloses a processor, which is connected to an external device for the purpose of downloading a program from the external device into its RAM memory. If the program is encrypted, a decryption module arranged in the processor accesses a key permanently stored in the processor in order to decrypt the program information.

Reference [3] mentions so-called on-board key generation in connection with smart cards.

Storing secret data, e.g. a device-specific random number, on an IC is possible today with standard IC production tools. However, the logistics for securely passing the random number or some related data from the IC manufacturer to the device manufacturer where the IC is used is with the present techniques either infeasible/expensive and/or requires special security management for handling the security data. In general, the device manufacturer and the IC manufacturer may be different parties. If some security data is managed by the IC manufacturer then this may be a security weakness, a possible target for attacks and may also increase the costs of the IC.

The same argument applies to the IC manufacturer generating and/or storing cryptographic keys on an IC on behalf of a device manufacturer.

The device manufacturer can let the IC manufacturer store, on the IC, data that is not possible to extract after IC manufacturing, unless very advanced reverse engineering is involved. However, using this device data in a security context with the help of state-of-the-art techniques requires security management in and between IC manufacturer and device manufacturer, and is either not secure or unfeasible/expensive in an industrialization process, in particular for a mass market.

The device manufacturer can insert security data into PROM thus avoiding to include the IC manufacturer as a trusted third party, and also avoiding costly changes in the IC manufacturing process. However, secrets in PROM are not as well protected against an adversary with access (even if it is just temporary) to the device. Moreover, the ASIC (Application Specific Integrated Circuit) technology required for realizing PROM functionality induces considerable extra costs on the IC, for example, through additional masks in the production process of the IC.

In addition, the IC manufacturer may want to limit the use of its ICs to those device manufacturers that he/she trusts or has business agreements with.

A somewhat different, but still related problem is for a third party, with trust relations to the device manufacturer and/or the user, to securely communicate with the device or with a user of the device. The security management of the device-specific security data may thus require including other parties as well.

SUMMARY

The present invention overcomes these and other drawbacks of the prior art arrangements.

It is an object to implement and utilize device-specific security data in devices such as mobile telephones, personal computers, cameras, audio devices, servers, base stations and firewalls.

It is an object to provide a method for securely and cost efficiently manufacturing a device with security data capabilities, as well as a method for management of security data. In particular, it is desirable to provide the device with tamper-resistantly protected and device-specific security data. It is also important to ensure that security data is protected from unauthorized parties during the entire manufacturing process of the device, without the need for extensive security management.

Another object is to provide an improved method for maintaining data security in relation to network communication between a network device and an external communication partner.

Still another object is to provide an improved method for marking digital content produced by a content-producing device.

A tamper-resistant electronic circuit is configured for implementation in a device and that securely implements and utilizes device-specific security data during operation in the device. The tamper-resistant electronic circuit is basically provided with a tamper-resistantly stored secret not accessible over an external circuit interface. The electronic circuit is also provided with functionality for performing cryptographic processing at least partly in response to or based on the stored secret to generate an instance of device-specific security data that is internally confined within said electronic circuit during usage of the device. The electronic circuit is further configured for performing one or more security-related operations or algorithms in response to the internally confined device-specific security data.

In this way, secure implementation and utilization of device-specific security data for security purposes can be effectively accomplished. The security is uncompromised since the stored secret is never available outside the electronic circuit, and the device-specific security data is internally confined within the circuit during usage or operation of the device. This means that the device-specific security data is kept unavailable from the external circuit programming interface and can only be used within the circuit to perform a security-related operation during usage and operation of the device. As a particular example, device-specific security data may be used in conjunction with a security-related operation to convert encrypted input information into clear text output information without revealing the stored secret or the device-specific security data itself. The security-related operation may be a simple operation, such as decryption of encrypted information, or a more complex, composite operation.

The electronic circuit may be an integrated circuit (IC), a smart card or any other tamper-resistant electronic circuit, though preferably an encapsulated circuit.

The tamper-resistant electronic circuit is generally applicable in a wide variety of devices, producing internally confined device-specific security data that can be used for various security-related purposes.

The electronic circuit may for example be arranged in a network device, and the device-specific security data handled by the circuit in operation within the network device can then be used for data security operations in network communication including data confidentiality, data integrity, authentication, authorization and non-repudiation. A specific example involves securing communication over insecure networks, including Internet and cellular communication networks.

In another application scenario, the electronic circuit is arranged in a device that produces digital content, and the device-specific security data handled by the circuit in operation within the content-producing device can then be used, e.g. for marking the produced digital content by generating a device-specific fingerprint embedded into the digital content.

More specifically, at circuit manufacturing, a random secret is preferably stored securely within the electronic circuit such as an IC. This could be implemented in such a way that not even the circuit manufacturer knows the secret. This secret data may be any arbitrary or randomly generated number typically belonging to a large set of numbers to avoid guessing or precomputation attacks. Furthermore, the electronic circuit is preferably provided with security or cryptographic algorithm(s) implemented for execution in the electronic circuit with the secret as (at least partial) input. Once the electronic circuit is installed by the device manufacturer for operation in the device, the stored secret may be used together with the cryptographic security algorithm(s) for generating an instance of security data that is specific for the particular device in which the electronic circuit is implemented.

Thus, the stored secret and the cryptographic algorithm(s) implemented in the electronic circuit allow generation of securely confined device-specific security data, e.g. encryption and decryption keys, bind keys, symmetric keys, private and associated public keys and/or other device-specific security data that can be used for various security operations.

In particular, it is clearly advantageous to be able to generate device-specific security data and provide fill security functionality based on whatever secret, random data that is originally stored in the electronic circuit by the circuit (IC) manufacturer.

Furthermore, the electronic circuit allows generation and management of device-specific security data for a wide range of devices in which the circuit may be arranged. In addition, since the secret data is securely stored in the circuit, there is no need for any extensive security management in the manufacturing of the device or in the distribution of circuits between the circuit (IC) manufacturer and the device manufacturer.

The cryptographic processing implemented on the electronic circuit is preferably based on a cryptographic function or algorithm designed so that it is computationally infeasible to deduce the result of the algorithm without knowing the secret, and/or to deduce the secret from the result.

The secret may be the sole input to the circuit-implemented cryptographic algorithm(s). Alternatively additional input data may be supplied and used together with the secret in the algorithm(s) to generate the device-specific security data. Preferably, trigger data required for generating device-specific security data is defined during configuration of the device, for example in a configuration phase during manufacturing or during user configuration. During usage of the device, the predetermined trigger data has to be applied over an external circuit interface in order to be able to generate proper security data. Unless the correct trigger data is applied, the cryptographic processing in the electronic circuit normally only generates nonsense data, or does not work at all. This implies that some form of predetermined trigger data is typically required by the electronic circuit in order to internally re-generate the device-specific security data.

If the trigger data is defined during manufacturing of the device or in connection thereto, the trigger data may have to be securely transferred from the device manufacturer to the device via an intermediate trusted party such as a network operator to which the user of the device is associated. Alternatively, the trigger data is defined by another configuring party such as the network operator and securely transferred to the device. It is also possible to store the predetermined trigger data in the device already during configuration for easy access when the device-specific security data needs to be invoked for a security-related operation. This means that an adversary with physical access to the device may possibly gain access to the trigger data or code to perform the security-related operation. However, the adversary will never gain access to the device-specific security data itself. In addition, a higher degree of security may be obtained by protecting the stored trigger code with a user-selected password.

For example, the trigger data or code may be defined based on configurational device-specific security data provided during configuration of the device. Preferably, the electronic circuit is configured for generating the trigger data as a cryptographic representation of the configurational device-specific security data, based on the stored secret, wherein the cryptographic representation is output over an external circuit interface during the configuration phase. During usage of the device, the device-specific security data is internally re-generated provided that said additional input corresponds to the cryptographic representation. The configurational security data may be provided over an external circuit interface during configuration, allowing the device manufacturer or other trusted party to freely select device-specific security data for manufactured devices. However, it is also possible to internally generate the configurational security data in the electronic circuit during the configuration phase.

In another embodiment, which relates to asymmetric cryptography, suitable additional input such as a prime, a generator of a mathematical group, a nonce and/or a PIN code may be applied to the circuit during configuration of the device, for example during a configuration phase in manufacturing or during user configuration, for generating an asymmetric key pair and for outputting the public key over an external circuit interface. During usage of the device, the corresponding private key is internally generated or re-generated provided that at least part of the same additional input is applied over an external circuit interface.

Alternatively, trigger data may be a simple seed, such as a nonce, a so-called bind identity or similar, that is initially applied to the electronic circuit during configuration of the device, forcing the electronic circuit to output device-specific security data over an external circuit interface in response to a so-called device access code. The device access code can be used for making device-specific security data available outside the circuit under certain circumstances, typically in a controlled environment during manufacturing of the device, whereas the security data is always internally confined within the electronic circuit during usage of the device.

In general, the electronic circuit may be provided with an authentication protocol for requiring authentication in order to grant access to certain functionality in the circuit, thereby effectively restricting usage of the circuit to authorized parties. Typically, the electronic circuit is configured for authenticating the device manufacturer or other configuring party, and for providing a device access code to the device manufacturer in response to successful authentication. For example, the device access code may be generated as a challenge-response pair based on a challenge from the device manufacturer and the secret stored on the electronic circuit. The electronic circuit may also be configured for disabling internal access to the stored secret and/or the device-specific security data, unless a predetermined device access code is entered into the electronic circuit. In this way, it can be ensured that only an authorized party, such as the device manufacturer and/or a trusted party, is allowed to use the stored secret for generation of device-specific security data and/or use the security data itself.

It should be understood that multiple individual trigger data signals might be defined during configuration of the device, where each trigger data signal is associated with a respective individual device-specific security data. The electronic circuit is then configured for generating a particular device-specific security data provided that the associated trigger data signal is applied to the circuit. This feature may be utilized for providing a multi-user identity module, such as a multi-user SIM (Subscriber Identity Module) for authentication and key agreement purposes, or a multi-channel decoder, such as a satellite or cable TV decoder, where multiple unique security keys are required.

The technology also relates to additional security management associated with the device-specific security data, e.g. certification and trust delegation, in order to enable trusted third parties to communicate securely with the network device and/or user.

The technology offers the following advantages:

Secure and cost-efficient implementation and utilization of device-specific security data for security purposes;

Uncompromised security, since the stored secret is never available outside the circuit, and the device-specific security data is internally confined within the circuit during usage of the device;

Efficient protection of device-specific security data within a tamper-resistant electronic circuit;

Ability to generate device-specific security data and provide full security functionality based on whatever secret random data that is originally stored in the circuit by the circuit (IC) manufacturer;

Requires only a very limited trust in the circuit (IC) manufacturer;

No extensive security management is needed in the manufacturing of the device, and/or between circuit (IC) manufacturer and device manufacturer;

Efficient use of trigger data for enabling generation of device-specific security data;

Possibility to restrict usage of certain functionality in the circuit to authorized parties.

Provision of device-specific security data in combination with the so-called generic trust delegation protocol or a device certification structure gives a feasibly implementable solution to the problem of key management for secure digital rights management; and Opens up for multi-user identity modules and multi-channel decoders.

Other advantages will be appreciated upon reading of the below description of example embodiments.

DETAILED DESCRIPTION

Figure 1:
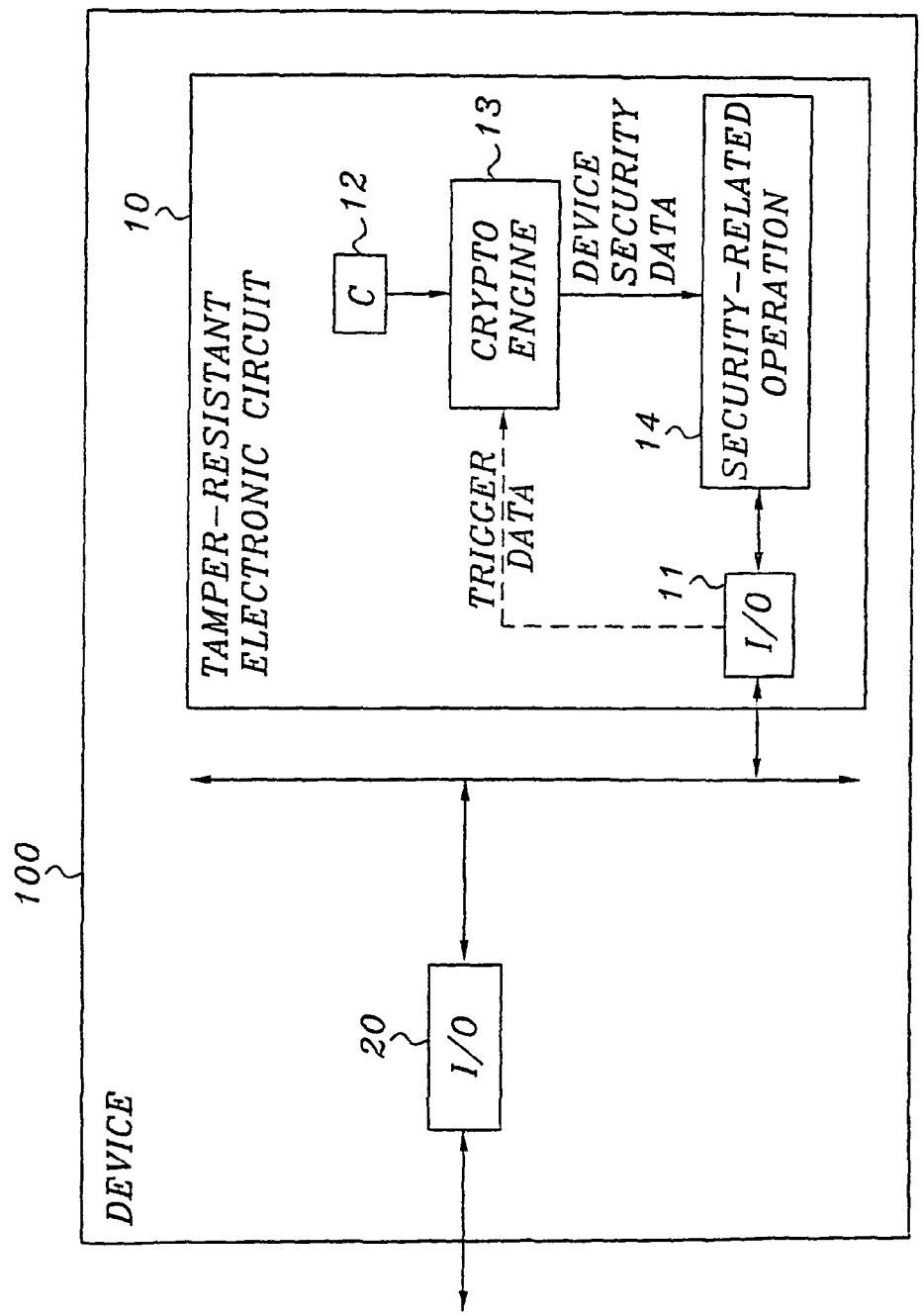
FIG. 1 is a schematic block diagram of a general device provided with a tamper-resistant electronic circuit according to an example embodiment.

Throughout the drawings, the same reference characters will be used for corresponding or similar elements.

General Overview

FIG. 1 is a schematic block diagram of a general device provided with a tamper-resistant electronic circuit according to a basic, preferred embodiment of the invention. The general device 100 includes a tamper-resistant electronic circuit 10, and typically also a general input/output unit 20 for transferring data to/from the device. Of course, the device may be equipped with additional units, e.g. for performing various types of data processing, all depending on the particular device and the overall function thereof.

The tamper-resistant electronic circuit 10 may be an integrated circuit (IC), a smart card or any other tamper-resistant electronic circuit, and preferably comprises an input/output unit 11, a storage unit 12 for a secret C, an engine or unit 13 for cryptographic processing and a practical realization 14 of a security-related operation. The stored secret C is not accessible over an external circuit interface and hence not available outside the electronic circuit 10. The cryptographic engine 13 is connected to the storage unit 12 and configured for performing cryptographic processing at least partly in response to the stored secret in order to generate an instance of device-specific security data that is internally confined within the electronic circuit 10 during usage of the device 100. This generally means that the device-specific security data generated by the cryptographic engine 13 is not available on the external programming interface of the electronic circuit during normal usage of the device 100. The security operation unit 14 is linked to the output of the cryptographic engine 13 and configured for performing one or more security-related operations in response to the internally confined device-specific security data.

It is a great advantage to be able to generate device-specific security data and provide full security functionality based on whatever secret data C that is originally stored in the electronic circuit 10. The security is uncompromised since the stored secret is never available outside the electronic circuit 10, and the internally generated device-specific security data can only be used within the circuit to perform a security-related operation during normal operation of the device.

The tamper-resistant electronic circuit is generally applicable in a wide variety of devices, producing internally confined device-specific security data that can be used for various security-related purposes. Examples of devices suitable for implementing an electronic circuit according to the invention include mobile telephones, personal computers, cameras, audio devices, network servers, security gateways, firewalls, base stations and so forth.

Network Device Application

Figure 2:
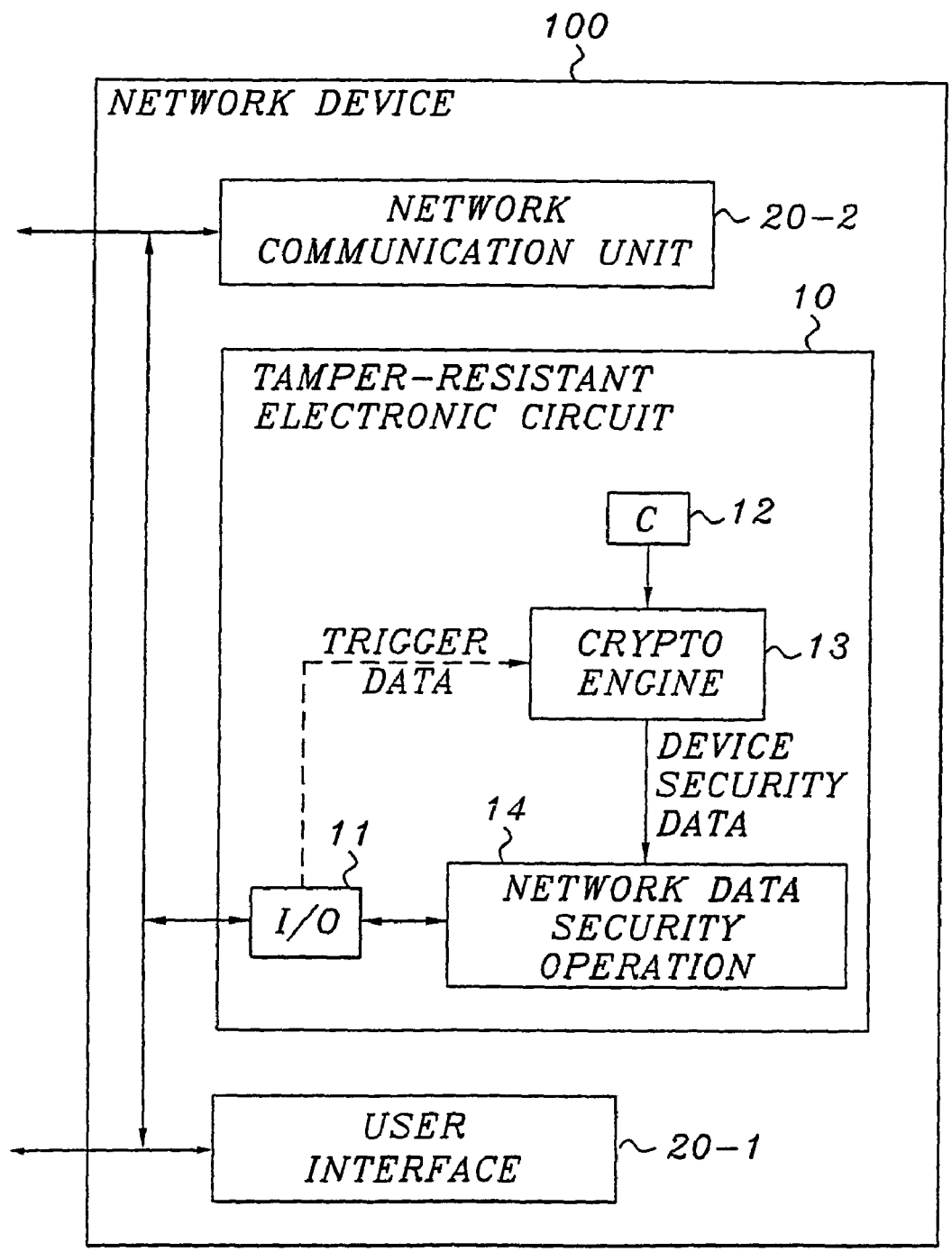
FIG. 2 is a schematic block diagram of an electronic circuit for implementation in a network device and configured for performing data security operations in network communication based on device-specific security data.

As illustrated in FIG. 2, the electronic circuit 10 may for example be arranged in a network device, and the device-specific security data internally generated by the circuit in operation within the network device 100 can then be used for data security operations in network communication. The network device 100 shown in FIG. 2 generally includes a tamper-resistant electronic circuit 10, a user interface 20-1, and a network communication unit 20-2 for communication with other network devices or entities in one or more networks. Examples of data security operations in network communication include data confidentiality data integrity, authentication, authorization and non-repudiation, as commonly defined, for example in references [4-6]. In another application scenario, the stored secret C may even be used to generate a terminal address, which is (unique) for the device/terminal and can be used for efficient network communication.

Content-Marking Application

Figure 3:
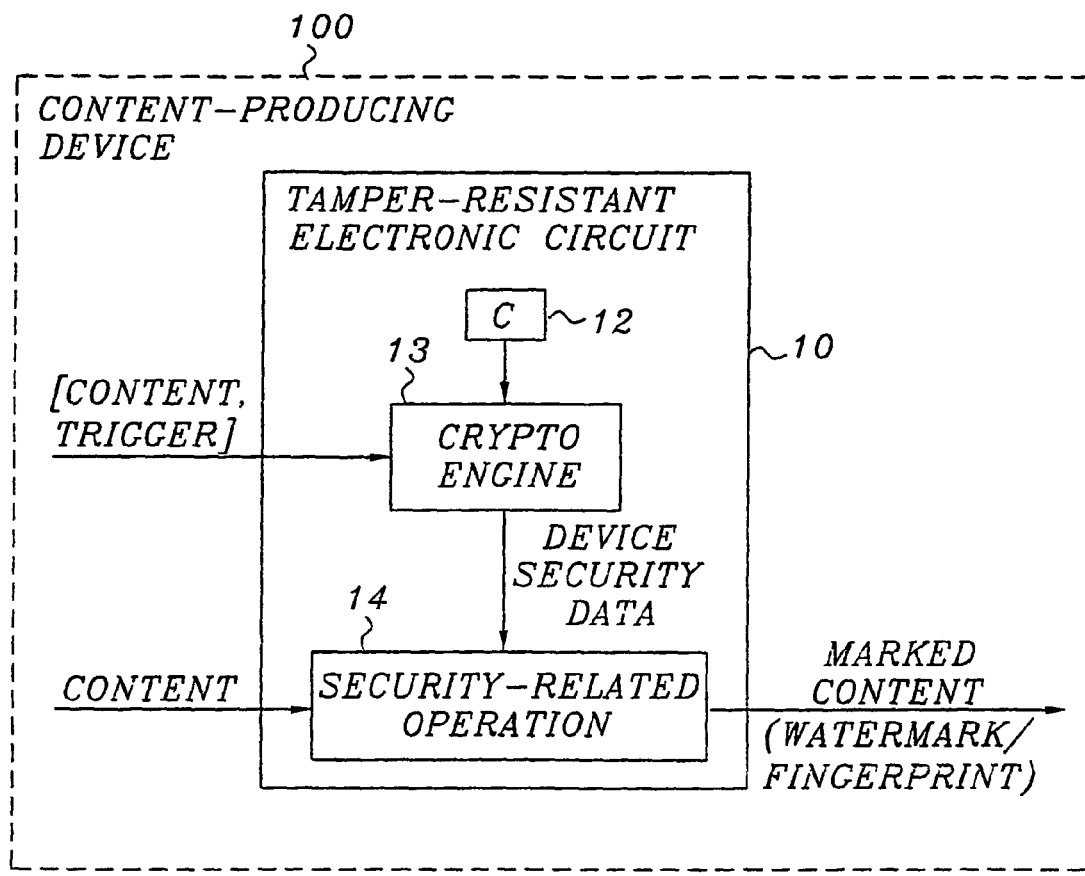
FIG. 3 is a schematic block diagram of an electronic circuit for implementation in a digital-content producing device and configured for performing content marking based on device-specific security data.

As illustrated in FIG. 3, the electronic circuit 10 may alternatively be arranged in a device 100 that produces digital content such as digital audio, video, images, text and so forth. Examples of such content-producing devices include digital photo cameras, video cameras, audio recorders, digital scanners and any digitizing equipment representing content in digital form. The device-specific security data internally generated and maintained by the circuit in operation within the content-producing device can then be used, e.g. for marking the produced digital content by generating a device-specific fingerprint embedded into the digital content. This means that content can be tied to the particular device that actually produced the content, and the fingerprint can later be used as evidence of production. Such a function becomes increasingly more important in particular in legal trials since the possibility or forging images has become widely spread through the advanced image processing software available to a low cost. For example, an instance of device-specific security data may be generated either solely in response to the stored secret C or in response to the stored secret in combination with additional input data such as some predetermined trigger data and/or the content itself. The internally generated device-specific security data is then used as input to the security-related operation implemented in unit 14 for embedding a device-specific fingerprint into the digital content based on the generated device-specific security data. The marked content is then output from the electronic circuit 10.

Content-marking may be particularly useful in a combination of a network device and a content-producing device, such as a mobile phone with an integrated camera, but is also applicable in stand-alone cameras or similar imaging, video or audio devices.

Manufacturing Scenario

The following is mainly described with a particular example scenario in mind, namely manufacturing of devices (also sometimes called entities), including management of initial secrets and/or device-specific security data, and subsequent usage of such security data within the devices. It should though be understood that this scenario is not limiting.

Figure 4:
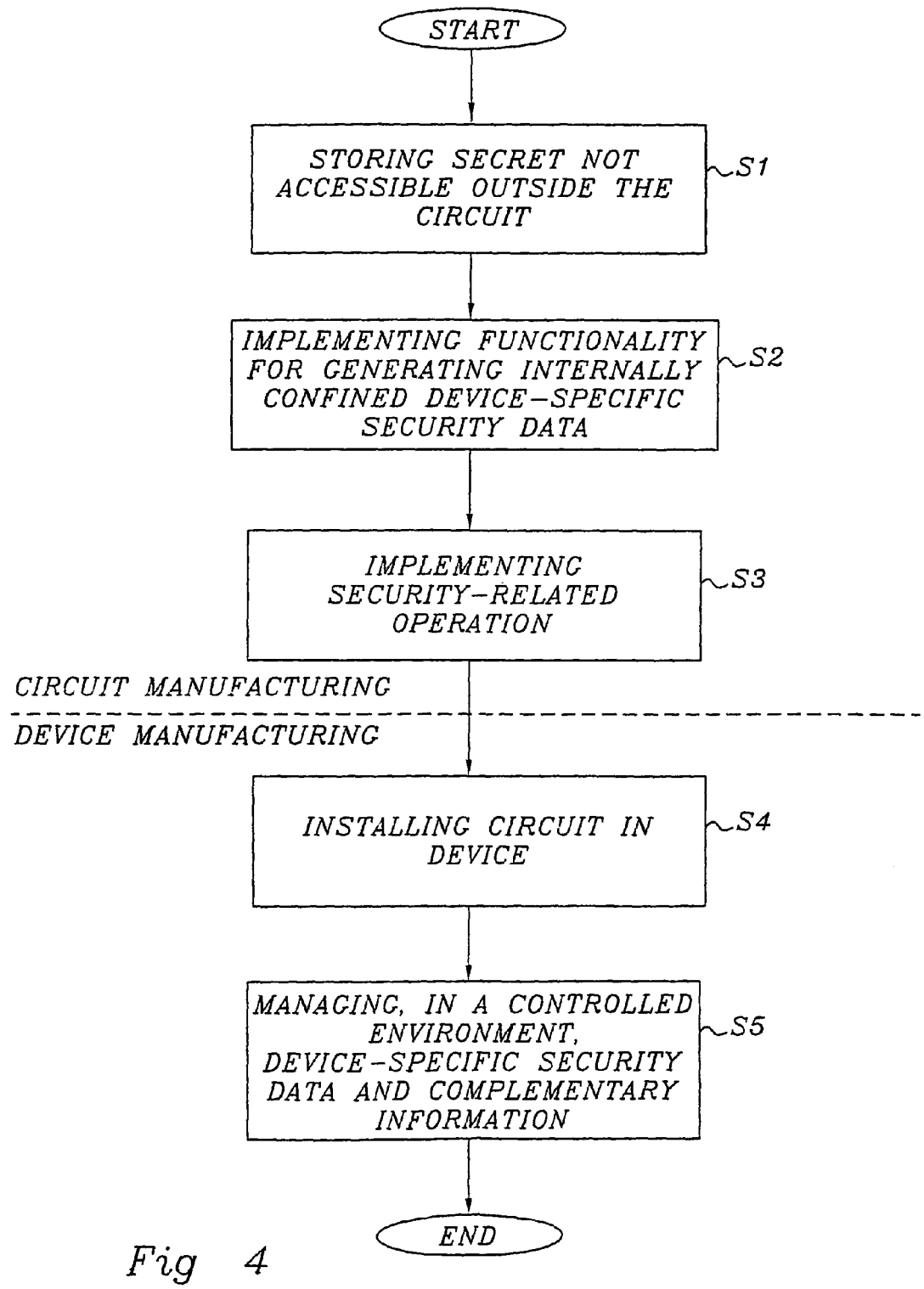
FIG. 4 is a schematic flow diagram of a method for manufacturing a device with security data capabilities, including management of device-specific security data, according to an example embodiment.

FIG. 4 is a schematic flow diagram of a method for manufacturing a device with security data capabilities, including management of device-specific security data, according to example embodiment.

In step S1, at circuit manufacturing, a more or less random secret is preferably stored securely within the tamper-resistant electronic circuit. This could be implemented in such a way that not even the circuit or chip manufacturer knows the secret. This secret data may be any arbitrary or randomly generated number. In step S2, which is also performed at circuit manufacturing, the electronic circuit is provided with cryptographic algorithm(s) implemented for execution in the electronic circuit with the secret as input or part of the input. Once the electronic circuit is installed by the device manufacturer for operation in a device, the stored secret may be used together with the cryptographic algorithm(s) for generating an instance of security data that is specific for the particular device in which the electronic circuit is implemented. The cryptographic algorithmic processing is preferably based on a cryptographic function designed so that it is computationally infeasible to deduce the result of the algorithm without knowing the secret, and/or to deduce the secret from the result. In step S3, a security-related operation is implemented into the tamper-resistant electronic circuit. The operation is configured for using the device-specific security data as input, and may be related to for example encryption/decryption, data integrity, authentication, non-repudiation, authorization, and content marking. The electronic circuit is designed in such a way that device-specific security data generated by the cryptographic algorithm(s) during usage of the overall device is internally confined within the electronic circuit. This may be accomplished by using a restricted register within the tamper-resistant electronic circuit that can only be accessed by the cryptographic algorithm(s) for write access and the security-related operation for read access during usage of the device. With state-of-the-art technology, it is today feasible to store for example 128-bits security key in a dedicated hardware register in an integrated circuit. Alternatively, internal confinement is ensured by means of memory protection techniques. For example, a protected area in an internal memory within the electronic circuit may be defined for storage of device-specific security data. Access to this protected area is then only allowed from one or more specified memory address areas, in which the above-mentioned cryptographic algorithm(s) and security-related operation are maintained in executable form.

Thus, the stored secret and the cryptographic algorithm(s) implemented in the electronic circuit allow generation of securely confined device-specific security data, e.g. encryption and decryption keys, bind keys, symmetric keys, private and associated public keys and/or other device-specific security data, that can only be used for various security operations within the electronic circuit In step S4, at device manufacturing, the device manufacturer installs the circuit in a given device. In step S5, the device manufacturer may also be responsible for the general management of device-specific security data and complementary information as generated during an optional, strictly controlled configuration phase, as will be explained in detail later on.

In particular, it is clearly advantageous to be able to generate device-specific security data and provide full security functionality based on whatever secret, random data that is originally stored in the electronic circuit by the circuit manufacturer. Furthermore, the electronic circuit allows generation and management of device-specific security data for a wide range of devices in which the circuit may be arranged. In addition, since the secret data is securely stored in the circuit, there is no need for any extensive security management in the manufacturing of the device or in the distribution of circuits between the circuit manufacturer and the device manufacturer.

In fact, very limited security management is required between circuit manufacturer and device manufacturer. The particular value of C is normally not relevant as long as it remains unknown to unauthorized parties, especially if no one knows or has access to C. It suffices that the stored secret C is sufficiently random over a sufficiently large set and impossible to link to the particular circuit. Since it is not necessary to record or derive information from C during circuit manufacturing, this can effectively be implemented within a controlled environment at the circuit manufacturer.

If desired or otherwise appropriate, additional security management between circuit manufacturer and device manufacturer can however be obtained by implementing, into the circuit, public key encryption (e.g. RSA encryption) of the secret C based on the public key of the device manufacturer, where the public key is stored in the circuit, and outputting the encrypted secret. The encrypted output can only be decrypted by the device manufacturer using the corresponding private key. In this way, C will be known to device manufacturer.

As will be described later on, the invention is also well adapted for additional security management of the device-specific security data, e.g. certification and trust delegation, in order to enable trusted third parties to communicate securely with the network device and/or user.

The type of security management that is appropriate depends on the particular threats or attacks that the system is required to be resistant against and also what parties in the system that to some extent are trusted. For example, management of security data for network devices is a very important task, since the security of the entire communication may rely upon it.

Accordingly, the parties authorized with device-specific security data may be different for different instances of the described problem. It is assumed throughout the following examples that the device manufacturer is trusted with the device-specific security data, though the technology is not limited to that assumption. As indicated above, the chip manufacturer does not need to be trusted with the security data, though some sort of trust relation is normally assumed, e.g. that the chip manufacturer implements what is agreed upon and introduces no secret "back-doors" and so forth. It is also common that the device owner or user is considered a trusted party, since it usually is in his/her interest to ensure that message transfer is secure. However, this is not necessarily true and will not be assumed; a particular exemption scenario is that of DRM.

Digital Rights Management (DRM), for example, is a technology for protecting a content provider/owner's assets in a digital content distribution system. The technology is in most cases implemented by encrypting the content, and associating to this content a so-called license that includes the decryption key (normally in encrypted form), and usage rights describing what is allowed to do with the content.

In the equipment that will be used for rendering the content, a DRM module/agent is implemented to ensure that the rendering follows what is prescribed by the usage rights. This agent is typically implemented as a software and/or hardware module, enforcing the usage policy as stated in the license. The DRM module/agent constitutes the trusted party within the user equipment, from the point of view of the content provider. Note that the user is not a trusted party, since the user may want to circumvent the content protection and use the content without the restrictions prescribed in the license.

The problem of securing the content is partly to manage the confidentiality of the content and the integrity of the license during transport from the content distributor to the device where the content will be used. A possible solution to this problem is for the content provider/distributor to securely deliver to the DRM module/agent in the rendering equipment a "key encryption key", which can be used to derive the content encryption key and check the license integrity. To protect the key encryption key, device security data, unavailable to the user, could be used by the DRM module/agent. Also some information related to this security data is needed by the trusted content provider/distributor to secure the transfer to this particular device. For example, if the security data is a decryption key, the corresponding encryption key is normally needed by the content distributor/provider.

Trigger Data—Configuration vs. Usage

With reference once again to FIG. 1, the stored secret C may be the sole input to the cryptographic engine. Alternatively, however, additional input may be applied via the input/output unit 11 of the electronic circuit 10 and used together with the stored secret C in the cryptographic engine 13 to generate the device-specific security data. In an embodiment, optional trigger data (indicated by the dashed line in FIG. 1) required for generating proper security data is defined during configuration of the device 100, for example in a configuration phase during manufacturing or during user configuration depending on the particular application.

During later usage of the device 100, the same trigger data has to be applied to the electronic circuit 10 into the cryptographic engine 13 to be able to generate the device-specific security data.

Figure 5:
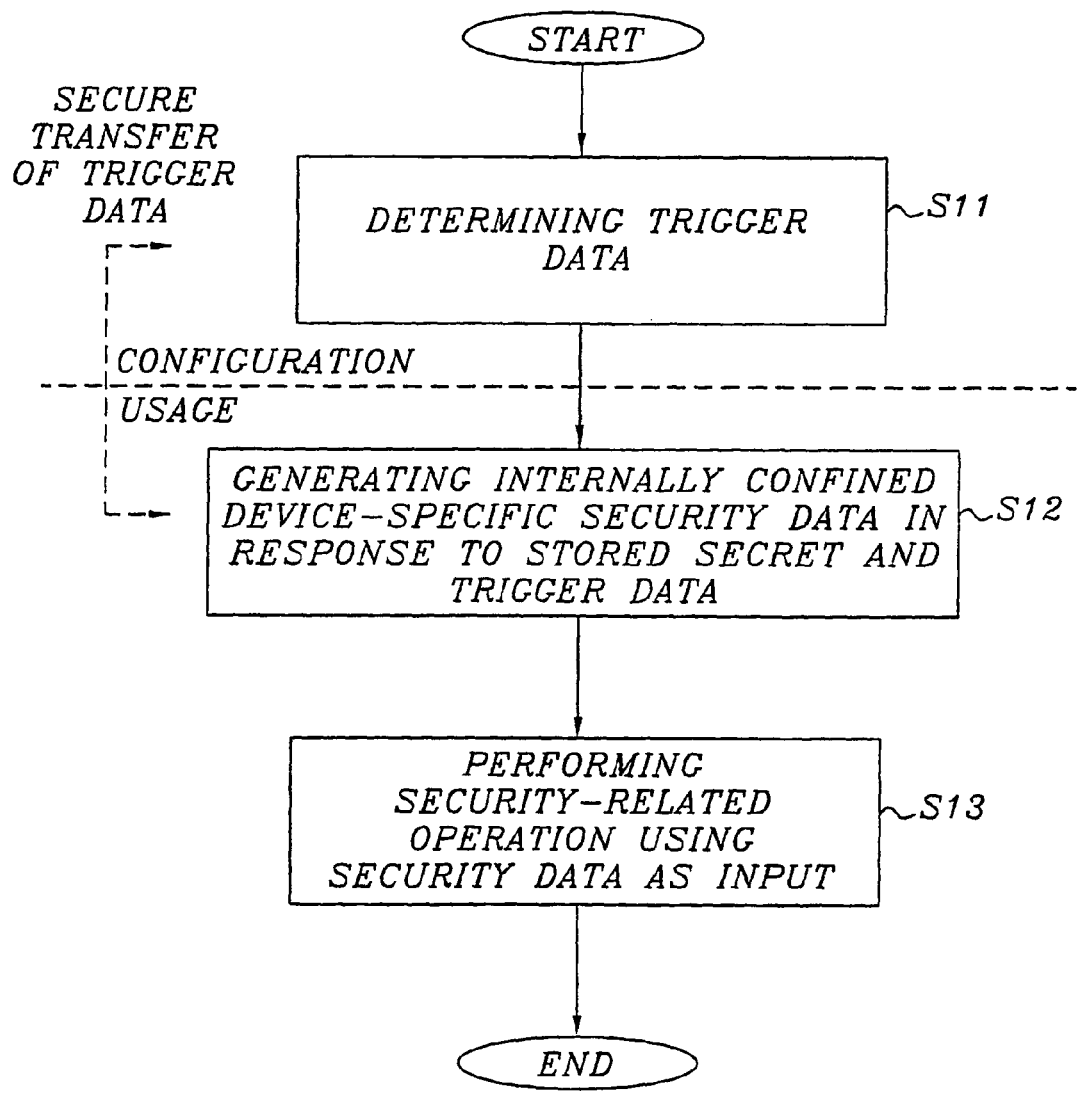
FIG. 5 is a schematic flow diagram illustrating configuration and usage of trigger data according to an exemplary embodiment.

As schematically illustrated in the basic flow diagram of FIG. 5, trigger data is determined during configuration of the device, perhaps in a configuration phase during manufacturing of the device or during user configuration (S11), as will be exemplified later on. During subsequent usage, internally confined device-specific security data is generated provided that the same trigger data is applied over an external circuit interface. In other words, both the stored secret C and the predetermined trigger data are required in order to be able to generate proper security data (S12). Finally, a security-related operation is performed in response to the internally generated and internally confined device-specific security data (S13). If the trigger data is defined during manufacturing of the device, the trigger data may have to be securely transferred from the device manufacturer to the device, for example via an intermediate trusted party such as a network operator to which the user of the device is associated.

Alternatively, the predetermined trigger data is stored in the device for easy access when the device-specific security data needs to be invoked for a security-related operation. In some applications, the additional input data may even be publicly known information, since only the owner of the device comprising the particular circuit is able to generate the result due to the stored secret involved. This means that an adversary with physical access to the device, may possibly gain access to the trigger data or code to perform the security-related operation. However, the adversary will never gain access to the device-specific security data itself, which is always internally confined within the circuit during usage of the overall device. In some applications, it may be advantageous to protect the stored trigger code, e.g. by means of a user-selected password.

Multiple Triggers

It is also fully possible to define multiple individual trigger data signals during configuration of the device, where each trigger data signal is associated with a respective individual device-specific security data. The electronic circuit according to the invention is then configured for generating a particular device-specific security data provided that the associated trigger data signal is applied to the circuit. This may be utilized for providing a multi-user identity module, such as a multi-user SIM (Subscriber Identity Module) for authentication and key agreement purposes, or a multi-channel decoder, such as a satellite or cable TV decoder, where several unique security keys are required. A certain key is simply activated by applying the corresponding trigger data.

In general, trigger data may be defined in several ways. By way of example, the trigger data may be defined based on configurational device-specific security data provided during configuration of the device, as will be described below mainly with reference to FIGS. 6 and 7. The trigger data may also be a simple seed initially applied to the electronic circuit during configuration of the device, forcing the electronic circuit to output device-specific security data over an external circuit interface in response to a so-called device access code, as will be outlined mainly with reference to FIG. 8. Alternatively, for applications based on asymmetric cryptography, suitable additional input such as a prime, a generator of a mathematical group, a nonce and/or a PIN code may be used as trigger data, as will be described below with reference to FIGS. 9-12.

Encryption/Decryption of Configurational Security Data

Figure 6:
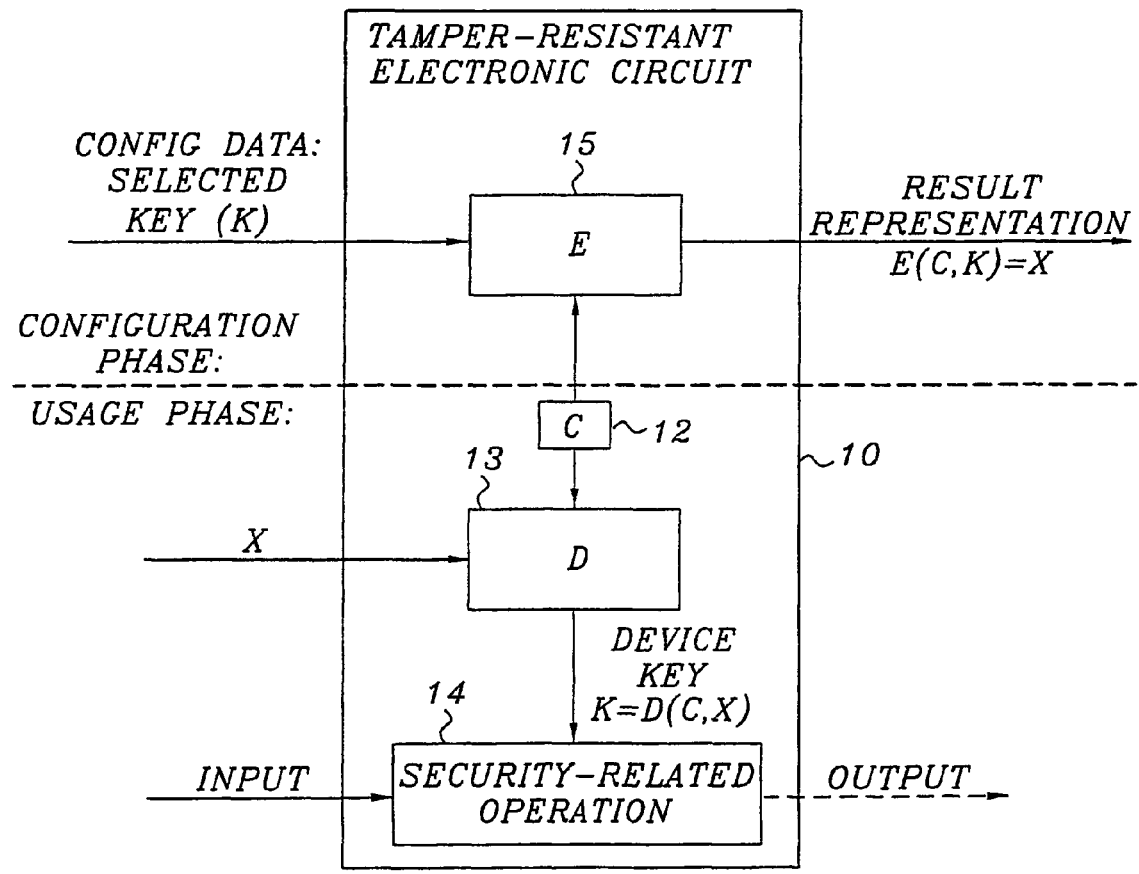
FIG. 6 is a schematic block diagram of a tamper-resistant electronic circuit provided with functionality for encrypting configurational security data into trigger data according to an example embodiment.

FIG. 6 is a schematic block diagram of a tamper-resistant electronic circuit provided with functionality for encrypting configurational security data into trigger data according to an example embodiment. Preferably, the electronic circuit 10 is configured for generating trigger data as a cryptographic representation of some configurational device-specific security data, based on the stored secret. The cryptographic representation is then output over an external circuit interface during the configuration phase. During usage of the device, the device-specific security data is internally re-generated provided that said additional input corresponds to the cryptographic representation. This allows the device manufacturer or other trusted party in control of the devices, such as a network operator, to freely select device-specific security data for manufactured devices during device configuration. This may be advantageous in certain applications where the security data is requited to have a particular format. For example, in asymmetric cryptography such as RSA or elliptic curves, the keys are not just random strings but rather have to be chosen with caution.

In addition to the random secret C implemented by the circuit manufacturer in the storage unit 12, the electronic circuit 10 includes a practical realization 15 of a trapdoor one-way function, in this case represented as an encryption algorithm E using the secret C as encryption key. The electronic circuit 10 also includes a practical realization 13 of the corresponding trapdoor inverse algorithm, in this case performing decryption D, as well as a realization 14 of a security-related operation.

During configuration, the device manufacturer or other configuring party generates any desired device-specific security data K, e.g. a cryptographic key, and applies this to the circuit 10 for encryption. It should be understood that the configuration does not necessarily have to be performed during manufacturing, but may be performed later, for example by the device manufacturer in a separate configuration phase or by a separate party, such as a network operator, in control of the manufactured devices. The cryptographic result representation $E(C, K)=X$ is recorded by the device manufacturer or other configuring party in a controlled environment and optionally stored in the device. The thus generated pair $(X, K)$ can for example be used later by the configuring party or a trusted third party to communicate securely with the device. If appropriate, considering the trust model, the result representation X and/or the corresponding configurational security data K can be managed by a trusted network operator. The result representation X may be securely transferred from the operator to the device, such as a mobile telephone or similar network device associated with the operator, based on a session key obtained from an authentication and key agreement procedure.

Alternatively, the cryptographic representation X is stored in the device already during configuration. Unless K is internally confined during usage of the device, an adversary with access to the device and the stored trigger data X may get hold of the device key K. Therefore, the internally generated device key K is never displayed outside the circuit during usage of the device, but only used within the circuit for whatever security operation or operations that are required. This means that the cryptographic representation X can be stored, for example in a PROM in the device and at the same time the sensitive device key K will resist attacks from an adversary with access to the device and to the programming interface of the electronic circuit. Optionally, if the trust model so admits, X may even be protected by the user, so that authentication by means of a password or PIN must be carried out to be able to retrieve X for input into the electronic circuit, optionally together with a limited number of trials before a special authentication code is necessary.

In summary, the circuit illustrated in FIG. 6 involves several layers of operations in two different phases: During a configuration phase, configurational data in the form of a device key K is encrypted with algorithm E. Later on, during usage of the device, the encrypted result representation is decrypted with algorithm D, and the resulting device key instance is then used as input to the security-related operation, such as decryption of encrypted information into clear text, data origin authentication, message integrity protection or a combination of such security operations, as is clear to anyone familiar with the field. Optionally, the operation D could incorporate non-cryptographic security-related functionality that is sensitive with respect to the trust model, e.g. management of data that should be available only for authorized parties and therefore remain within the circuit. DRM lends a particular example to this where high quality clear text content (such as text, audio and video) may be required to remain confidential, though a lower resolution copy is allowed to reach the rendering device.

Thus, the security-related operation could be configured for selectively reducing the resolution or selectively performing D/A conversion and so forth controlled based on information relating to the device key K.

Naturally, the above procedure can be extended to multiple pairs (K, X) and/or multiple secrets C. Again, the actual value of C is not generally relevant as long as it is not known by any unauthorized party.

It should also be understood that is possible to internally generate the configurational security data in the electronic circuit during the configuration phase, as will be explained later on in connection with FIG. 12.

Figure 7:
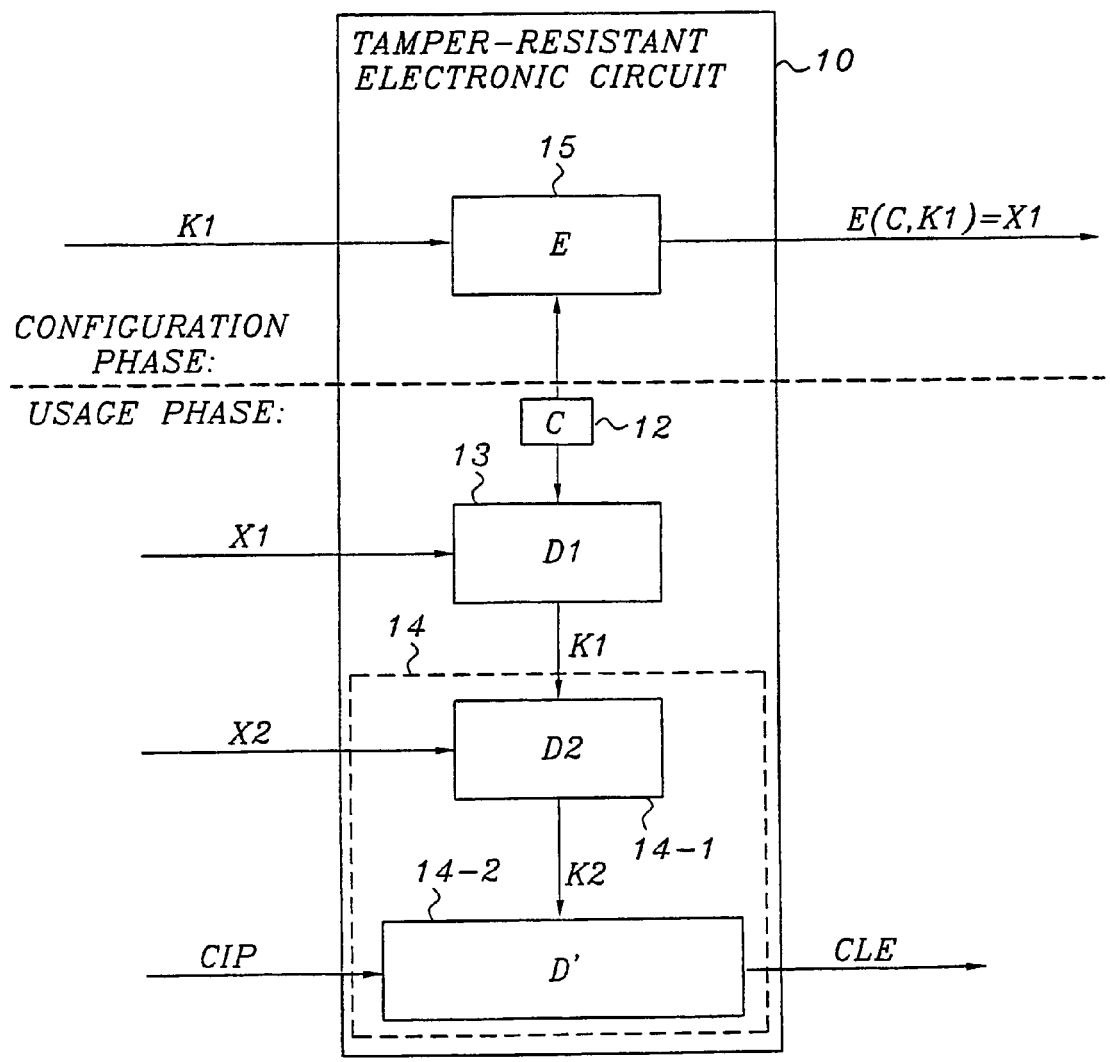
FIG. 7 is a schematic block diagram of a particular embodiment of the circuit of FIG. 6 with further security enhancements using an additional input key.

FIG. 7 is a schematic block diagram of a particular embodiment of the circuit of FIG. 6 with further security enhancements using an additional input key. In order to further enhance the security of the tamper-resistant electronic circuit of FIG. 6, an additional input key may be employed as is illustrated in FIG. 7. Similarly to FIG. 6, during configuration, e.g. at manufacturing, the device manufacturer or other configuring party uses the algorithm E implemented in unit 15 and key C to encrypt security data K1. The obtained encrypted output X1 may be stored in the device during configuration or otherwise transferred securely to the device and subsequently input to the associated decryption algorithm D1 implemented in unit 13. Additional security data I2 could also be generated and internally confined within the electronic circuit 10. An encrypted representation X2 of security data K2 is preferably provided to the device for use as input to the electronic circuit 10. K2 may initially be generated by the device manufacturer or other configuring party, e.g. in connection with the encryption of K1. Alternatively, K2 may initially be generated by a third party, e.g. a content provider or distributor, which wants to securely distribute digital data to the device. In such a case, the content provider represents K2 as X2 in such a way that internal access to K1 is necessary for internally reproducing K2, e.g. if K1 is a private key then X2 is the corresponding public key encryption of the key K2. The private key could be a private key of the device manufacturer and does not have to be known by the user. The public key could be available, e.g. from a Certificate Authority of a Public Key Infrastructure. The content provider then distributes X2 to the device. An associated decryption algorithm D2 is implemented in unit 14-1 in the electronic circuit for decrypting the received encrypted input X2 by means of the internally generated K1. Decryption of data (or other security operation) received from the device manufacturer or a third party, e.g. the content provider, based on the security algorithm D' implemented in unit 14-2 is available by entering X1 and X2 and the received data, cip, into the relevant circuit interface to obtain the clear text cle.

Selectively Allowing External Access to Security Data during Configuration

Figure 8:
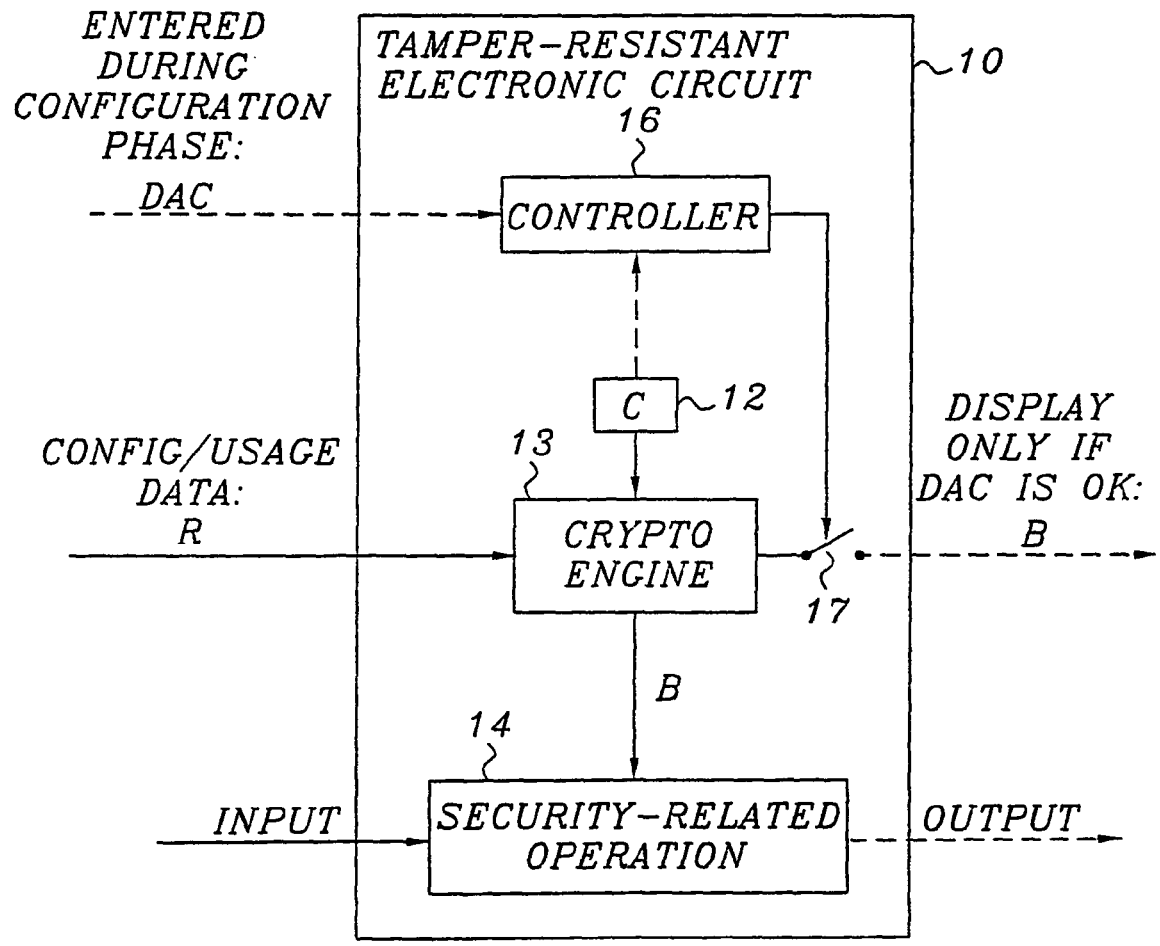
FIG. 8 is a schematic block diagram of a tamper-resistant electronic circuit provided with device access code functionality for allowing external access to generated security data during configuration, according to another an example embodiment.

FIG. 8 is a schematic block diagram of a tamper-resistant electronic circuit provided with device access code functionality for allowing external access to generated security data during configuration, according to another preferred embodiment of the invention. As previously mentioned, the trigger data may alternatively be a simple seed, such as a nonce, a bind identity or similar data, which is initially applied to the electronic circuit during configuration of the device for generating device-specific security data B based on the stored secret C and the input trigger data R. For example, R may be a random bit string and/or some unique device identity. The cryptographic engine 13 is preferably implemented with an approximation of a cryptographic one-way function fusing the secret C and the trigger data R as input. For example, the cryptographic one-way function could be a keyed MAC (Message Authentication Code), see [7, 8], of the input data R using C as the key.

In addition to the basic storage unit 12 for the maintaining the secret C, the cryptographic engine 13 and the security-related operation 14, the tamper-resistant electronic circuit 10 shown in FIG. 8 also comprises a controller 16 and a switch arrangement 17 for selectively forcing the electronic circuit to output the device-specific security data B over an external circuit interface during configuration. The controller 16 preferably operates in response to a so-called device access code (DAC), and closes the switch 17 for making the device-specific security data B available outside the circuit when the DAC is applied to the circuit during the configuration phase. For example, the DAC may be given to the device manufacturer or other configuring party by the circuit manufacturer in an authorization procedure, as will be described in detail later on. If the correct DAC is not entered during configuration, the switch 17 remains open and the device-specific security data B is only available on appropriate internal interfaces, and consequently never leaves the electronic circuit 10. After configuration, it may even be desirable to disable the controller 16 to ensure that an adversary with physical access to the device can not attack the circuit 10 by testing different codes in an attempt to get hold of the device-specific security data.

For example, the configuration may be performed during manufacturing, where the device manufacturer inserts the electronic circuit such as an IC received from an IC manufacturer into a particular device. By using the implemented cryptographic function f, device-specific security data can be obtained: In a controlled environment, the device manufacturer enters some data R as input to the algorithm implemented in the cryptographic engine in the circuit to generate the result $f(C, R)=B$, and also applies a predetermined DAC to the controller 16 to enable external output of the resulting security data B.

In the example of FIG. 8, the device manufacturer or other configuring party is generally not able to choose device-specific security data but has to accept whatever comes out of the one-way function f, whereas in the examples of FIGS. 6 and 7, the configuring party is free to select the device-specific security data.

The pair (R, B) may be used later, e.g. after the device has been sold to a user, by the device manufacturer or other configuring party, or even a third party trusted by the device configurer to communicate securely with the device. The device-specific security data B can be used to secure the communication, e.g. as a cryptographic key in a symmetric encryption algorithm or in a message authentication code. During usage, the trigger data R is required by the device to internally recreate B in the electronic circuit 10. For example, if R is equal to a RAND in a key agreement procedure such as GSM AKA (Authentication and Key Agreement) or UMTS AKA, the resulting device-specific security data will be an AKA session key.

The trigger data R can be stored in the device during manufacturing and/or configuration, or supplied prior to establishment of the secure communication. Although high confidentiality is preferred, the trigger data R does not necessarily need to be kept confidential since only with access to the right electronic circuit, the relevant security data B can be produced, and during usage of the device, the security data B never leaves the circuit. However R is preferably integrity protected, e.g. with B or by some out-of-band mechanism, to protect from e.g. disturbances in communication, manipulation and/or denial-of-service attacks.

An example of a particular application could be a company owning/managing a number of network nodes communicating over an unsecure network. For example, the nodes/devices could be radio base stations in a mobile network, electricity consumption metering devices, automatic drink/food resales machines, all provided with electronic circuits with the general structure of FIG. 8. During configuration of the nodes by the trusted staff of the company, a number of node-specific keys B are generated by the manufacturer in response to one or more input numbers R, using one or more DACs to extract the security data from the circuits. During usage, the input number(s) R is distributed (preferably integrity protected) to the network nodes (or stored therein during manufacturing/configuration), and input to the corresponding electronic circuits to generate the node-specific key(s) B. Once the secret key(s) B is/are securely shared between the involved nodes, secure communication can be established by means of any conventional cryptographic protocol using B.

Multiple pairs (R, B) may be generated and/or multiple secrets C may be implemented, e.g. to enable revocation of certain security data or to differentiate between communications parties.

In another particular example, the pair (R, B) may constitute a bind-identity-bind-key pair. An example of delegation of trust involving generation of bind-identity-bind-key pairs is a protocol called the Generic Trust Delegation (GTD) protocol. It may be useful to give an overview of the basics of the GTD protocol. The mechanism for establishment and delegation of trust in the GTD protocol is based on the assumption that two parties P1, typically a device manufacturer, and P2, typically an associated device, share a (symmetric) secret. The protocol takes advantage of the fact that the device manufacturer P1 normally has assigned a secret device key to the device P2, which device key is properly protected in the device. A third party P3, having a trust relation with P1, wants to communicate securely with P2. As a main component, the GTD protocol includes a basic request-reply protocol, in which P3 requests, from P1, a bind key for secure communication with P2. The party P1 generates a bind identity, unique for the pair P2 and P3. Then, party P1 derives a bind key based on the bind identity and the secret that P1 share with P2, preferably by using a cryptographic one-way function. The bind key, normally together with the bind identity, is sent securely from P1 to P3 (the security is based on keys derived from the existing trust relation between P1 and P3). Since P2 knows the shared secret between P1 and P2, the party P2 can also calculate the same bind key given the above bind identity. The latter is generally not confidential and may be sent to P2 from P1 or P3. Accordingly, P2 and P3 can then communicate securely using the bind key. Naturally, instead of the device-specific key itself, another key derived therefrom could be used on both sides for calculating the bind key. In this procedure, P1 thus "delegates trust" to P3 in the form of the bind key between P2 and P3.

The device manufacturer never has to reveal the device-specific key (or more generally the entity key) to any other party, since there is no need to transfer the device-specific key outside of the device and the device manufacturer (or other device configurer). In addition, the GTD protocol does not require a single third party trusted by all device manufacturers.

The unknown secret never has to leave the domain of the manufacturer, except in the protected area within the electronic circuit of the device where the (circuit) manufacturer stored the secret during manufacturing. The manufacturer thus has more possibilities and all incentives to keep the secret confidential, compared to the prior art.

Generating Private Key and/or Asymmetric Key Pair

Figure 9:
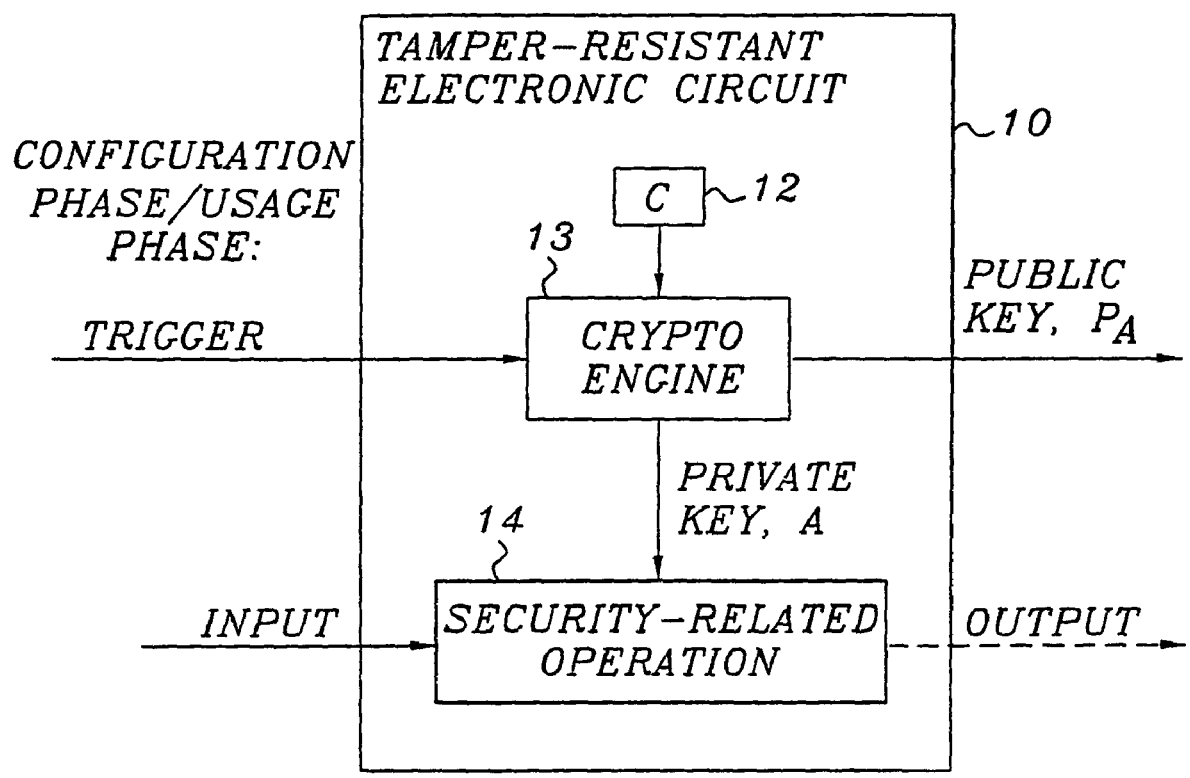
FIG. 9 is a schematic block diagram of a tamper-resistant electronic circuit responsive to trigger data for selectively generating an asymmetric key pair/private key according to yet another an example embodiment.

FIG. 9 is a schematic block diagram of a tamper-resistant electronic circuit responsive to trigger data for selectively generating a private key/an asymmetric key pair according to yet another embodiment. In FIG. 9, suitable additional input such as a prime, a generator of a mathematical group, a nonce and/or a PIN code may be applied to the circuit during configuration of the device, either during a configuration phase in manufacturing or during user configuration, for generating an asymmetric key pair (A, P.sub.A) and for outputting the public key P.sub.A over an external circuit interface. During usage of the device, the corresponding private key A is internally re-generated provided that at least part of the same additional input is applied as trigger data over an external circuit interface. The internally generated private key A may then be used for PKI (Public Key Infrastructure) operations such as encryption/decryption and authentication.

Figure 10:
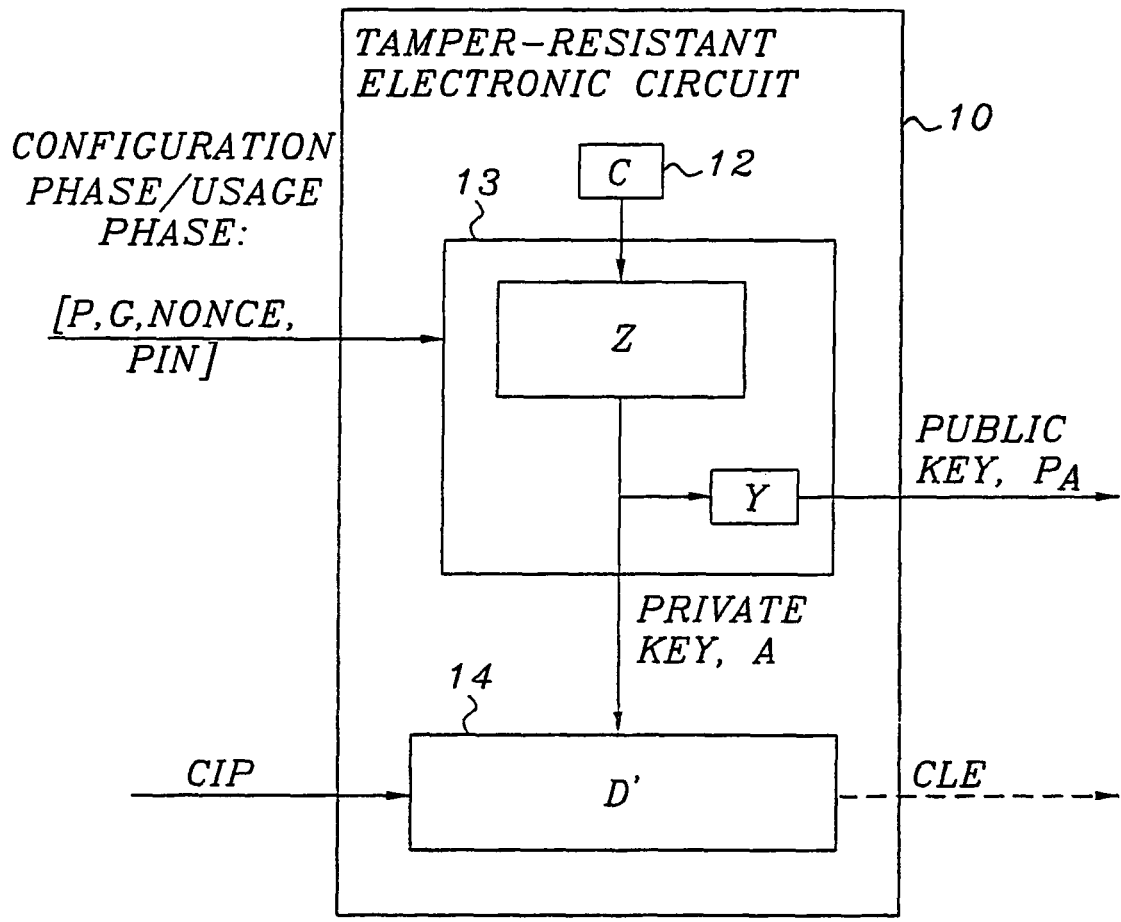
FIG. 10 is a schematic block diagram of a particular embodiment of the circuit of FIG. 9 implemented for generation of private and public keys.

FIG. 10 is a schematic block diagram of a particular embodiment of the circuit of FIG. 9 implemented for generation of private and public keys. In the following, we consider the exemplary case of cryptography based on discrete logarithms. As an example, it is possible to use the discrete logarithm problem over the multiplicative group of integers modulo a large prime P with generator G. An integer chosen at random from 1, . . . , P-2 can be used as a private key. As illustrated in FIG. 10, we will designate this number A, which may be identical to the unknown chip secret number C or derived from the chip secret together with optional input. As before, the number A is hidden within the electronic circuit and should not be possible to extract, nor any (except negligible) information of A.

The cryptographic engine 13 is based on a general function Z for generating key A based at least on the secret C. A large prime P could optionally be input to the engine 13, which then have to generate a suitable A. Also generator G could be input, but the circuit should then preferably check if G is a generator of the group. A nonce generated e.g. by the device manufacturer may also optionally be input to the circuit for use in the generation of the key A.

It should also be possible to generate and output a corresponding public key $P_A$ from the circuit, this could e.g. be $G^A$ mod P and/or other information such as G or P. The cryptographic engine 13 then also include a general function Y for generating this public key $P_A$, preferably based on P, G and A. The public key should be distributed in an authenticated manner to the relevant communications partner so that it can be used securely, more of which will be described later. The electronic circuit 10 can perform one or more public key operations D' such as e.g. encryption or digital signature functions based on the private key A. Specific examples are ElGamal encryption and ElGamal signature.

The unknown secret C is easily generated and stored in the circuit 10 (e.g. IC) during circuit manufacturing, and with the new functionality shown in FIG. 10, it is thus possible to generate an asymmetric key pair that can be used by the device in which the IC is arranged for secure communication.

Figure 11:
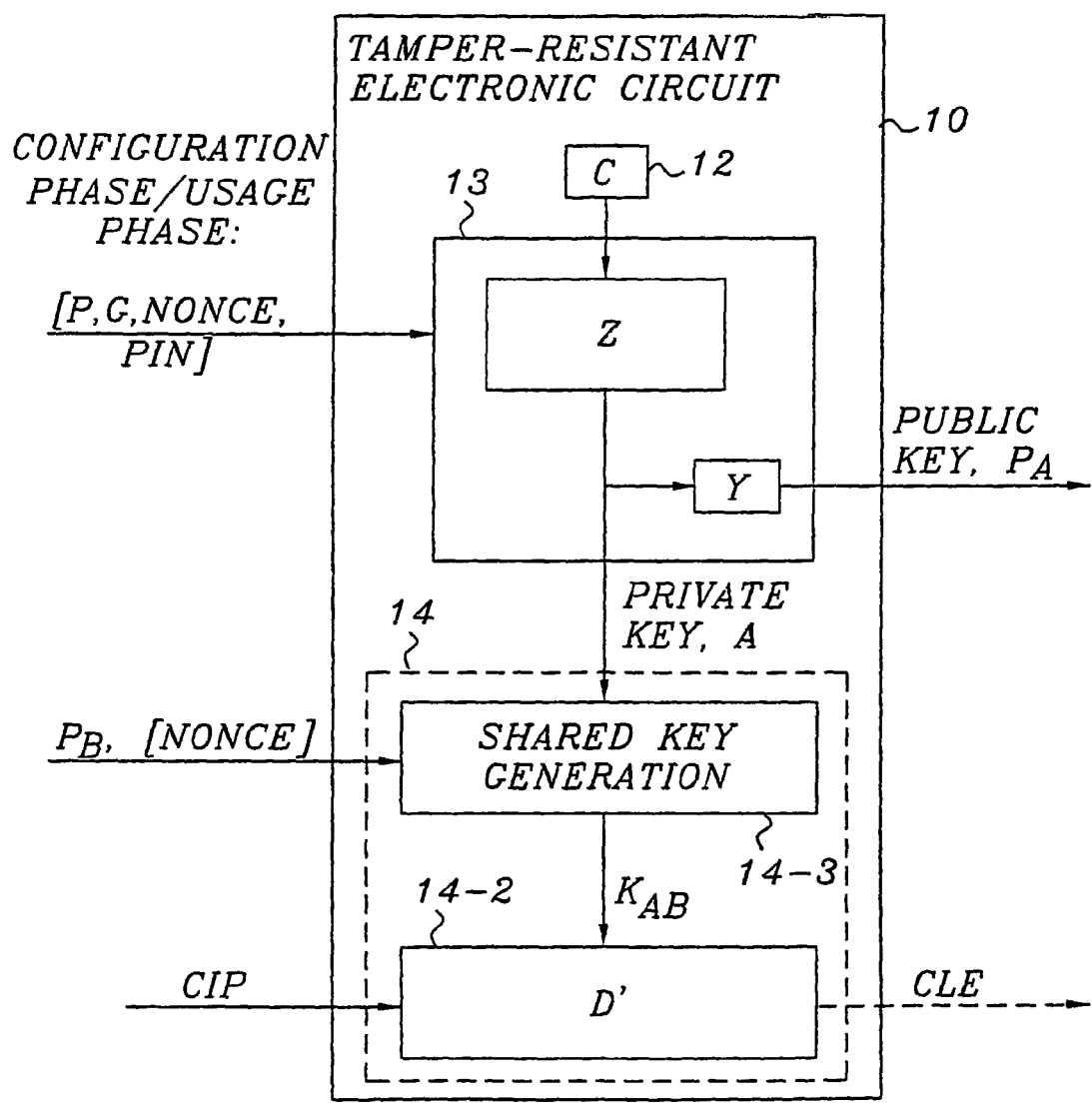
FIG. 11 is a schematic block diagram of an electronic circuit implemented for shared key generation (e.g. Diffie-Hellman) based on generation of private and public keys.

Another usage of this public-private key pair is shared key generation, as schematically illustrated in FIG. 11. For example, for Diffie-Hellman shared key generation, the device public key $P_A=G^A$ mod P is exchanged for the communications partner public key $P_B=G^B$ mod P, where B is the corresponding private key. $P_B$ is fed into a shared key generation unit 14-3 in the circuit 10 and the shared secret $G^{AB}$ mod P is calculated. An optional random nonce may be also used in an algorithm together with the shared secret to guarantee freshness and restrict the leaking of information of the private keys. The result is a shared secret key $K_{AB}$, which is not externally available. The established key can then be used for a security-related operation D' such as conversion of encrypted information CIP into clear text output CLE, as implemented in unit 14-2.

More generally, if A is a private key with corresponding public key $P_A$ in an asymmetric cryptographic scheme, with A protected within a tamper-resistant electronic circuit, the invention also covers the case that a symmetric cryptographic key K, encrypted by the public key $P_A$, is decrypted and used within the circuit, and not exposed outside the circuit, in analogy to the previous examples.

Depending on usage, the private key may be used as a device key. Optionally, the corresponding public key may be certified by the device manufacturer, as will be exemplified later on.

In an alternative embodiment, the user generates a private key, not necessarily directly derived from the chip secret. For example, the cryptographic engine 13 may be implemented with a pseudo-random number generator, which using the chip secret as seed could be iterated a number of times, possibly with some additional input to generate a private key. As in previous examples, the private key may be hidden within the electronic circuit and the corresponding public key available outside.

Optionally, an additional nonce may be inserted by the user during generation of the key. Alternatively, or as a complement, a PIN (Personal Identification Number) or a password mapped to a number may be the nonce or part of the nonce to enable user authentication in the sense that the PIN or password is necessary to produce the private key inside the circuit.

Figure 12:
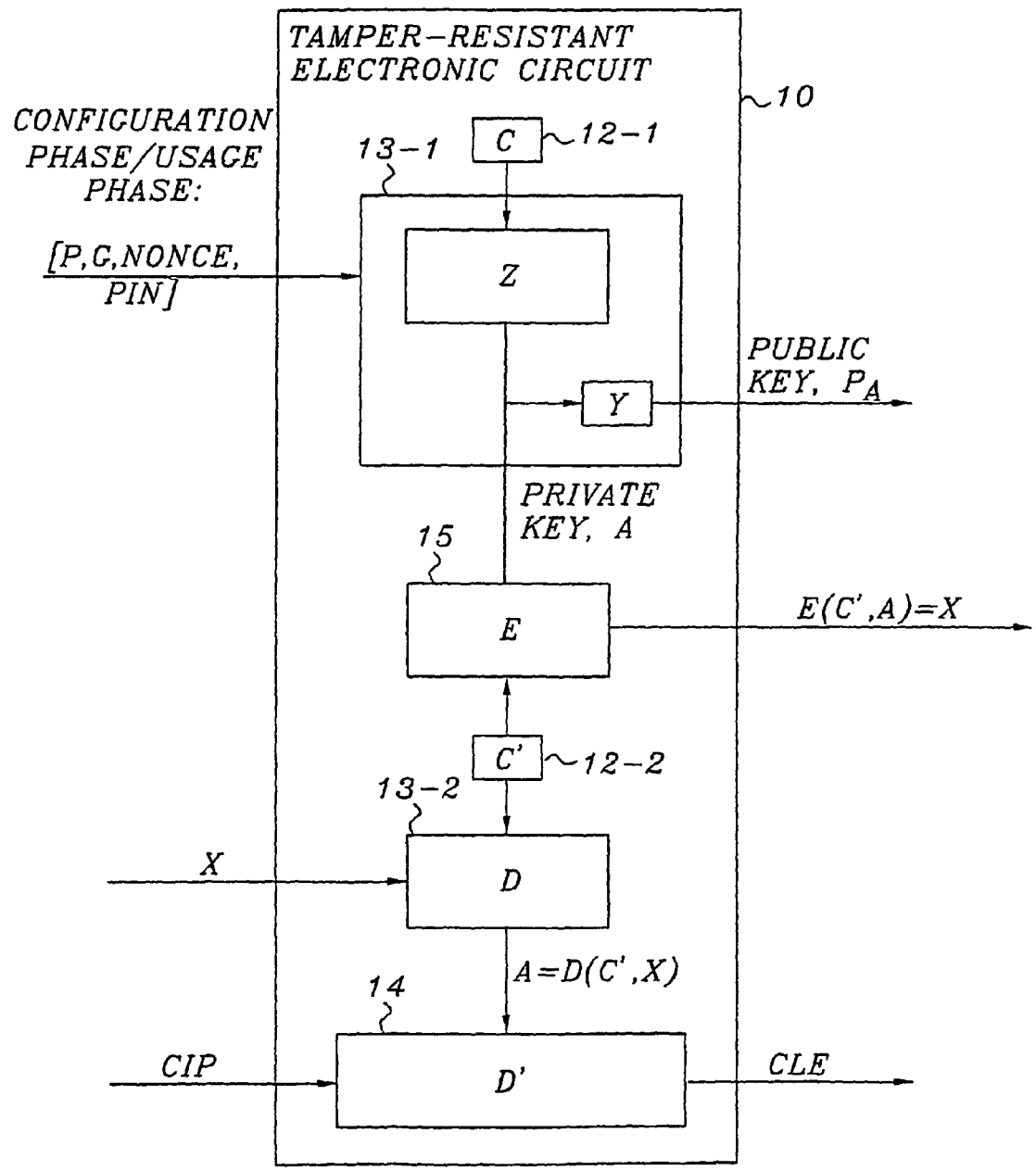
FIG. 12 is a schematic block diagram of an embodiment of an integrated circuit implemented for generation of private and public keys and provided with an encryption algorithm for cryptographically protecting the output private key.

Yet another option that can be used in conjunction with the methods above is to encrypt the private key, generated as in one of the cases above, with encryption algorithm E and chip secret C' and output the encrypted private key X, as illustrated in FIG. 12. In similarity to the embodiments of FIGS. 9-11, the tamper-resistant electronic circuit 10 shown in FIG. 12 includes a storage unit 12-1, a cryptographic engine 13 for generating an asymmetric key pair, and a security-related operation 14. In addition, however, the circuit 10 in FIG. 12 also includes an encryption unit 15 implementing algorithm E, a further storage unit 12-2 for an additional secret C' and a decryption unit 13-2 for decrypting an encrypted private key.

This is actually a hybrid of the realization of FIG. 9 or FIG. 10 and the realization of FIG. 6, but where the so-called configurational device-specific key, here the private key A, is internally generated in response to optional input data and subsequently encrypted into a result representation X. When the private key needs to be used within the electronic circuit during usage of the overall device, X is inserted into decryption unit 13-2 via a special interface and then decrypted by D based on C'. The internally generated private key A can subsequently be used in algorithm D'. Optionally, X may be password protected or require other user authentication.

Although the realizations illustrated in FIGS. 10-12 are based on discrete logarithms, it should be understood that other schemes for generating an asymmetric key pair are also feasible.

Authorizing the Use of Circuit Capabilities

As previously mentioned briefly, it might be in the circuit manufacturer's interest to enforce that the device manufacturer or other configuring party can only utilize the tamper-resistant electronic circuit when so being authorized by the circuit manufacturer. Also or alternatively, depending on the trust model, the device manufacturer can desire to authorize which (further) parties (if any) that should have access to capabilities of the electronic circuit. This can be achieved by "conditioning" certain operations within the electronic circuit, based on an authentication process. Such operations could be, e.g. access to the value C for certain algorithms, and even output of certain values, possibly also including C, from the circuit. The authentication process could be a simple maintenance/user password, but preferably involves a secure authentication mechanism such as the Fiat-Shamir protocol [9] or other zero-knowledge protocol.

Figure 13:
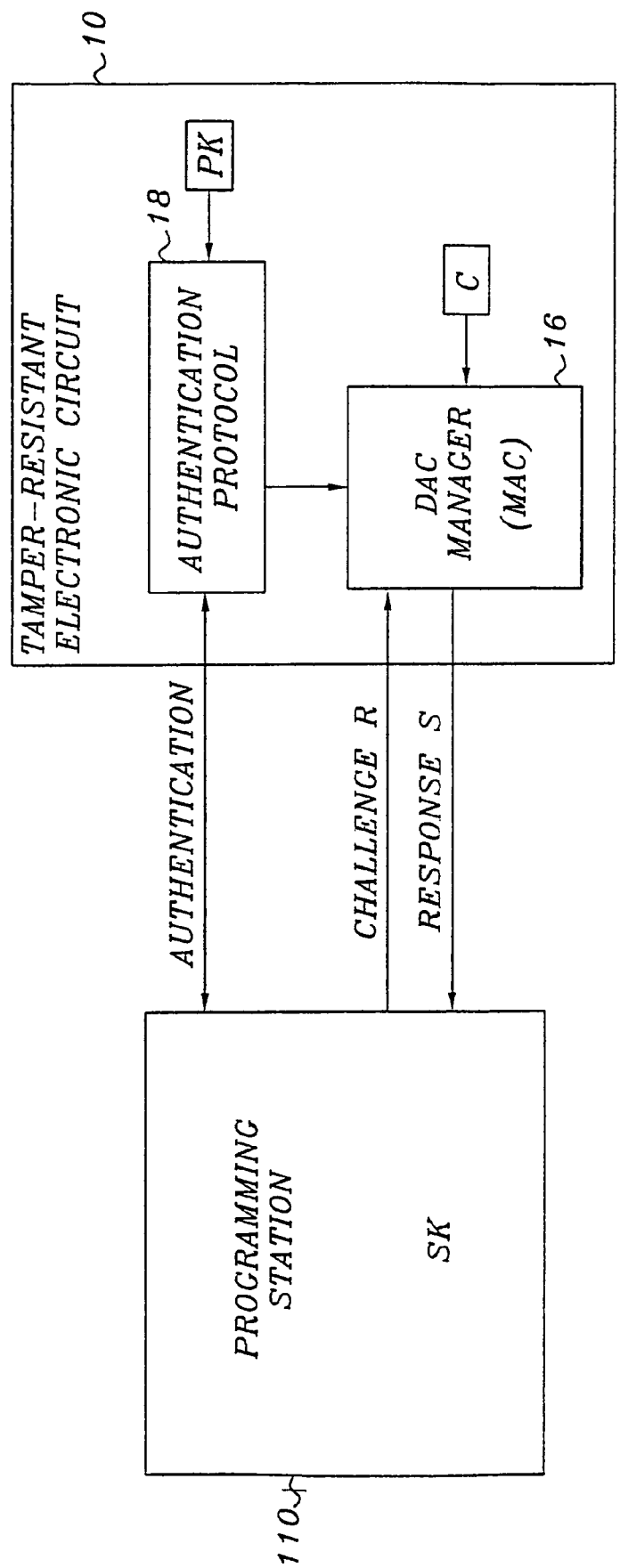
FIG. 13 is a schematic block diagram of an embodiment of an electronic circuit implemented with an authentication protocol and an associated device access code manager/controller.

FIG. 13 is a schematic block diagram of an embodiment of an electronic circuit implemented with an authentication protocol and an associated device access code (DAC) manager/controller. For simplicity, only those parts of the circuit that are relevant to the authentication and device access code are illustrated in FIG. 13. We now give an example of an authentication procedure for providing a device access code. Preferably, an authentication protocol 18 such as the Fiat-Shamir protocol is implemented in the electronic circuit 10. This enables the electronic circuit 10 to authenticate the device manufacturer or other configuring party based on a public key PK implemented in the circuit 10. The device manufacturer or other configuring party utilizes a programming station 110 to transfer information signed by a private key SK to the electronic circuit 10 for verification in the authentication protocol unit 18 based on the corresponding public key PK. This apparently implies that the public key PK has to be entered into the electronic circuit 10 already during circuit manufacturing. The device manufacturer or other configuring party typically produces asymmetric key pairs (SK, PK) and provides the circuit manufacturer with a public key PK or a list of such public keys. The public key is of course public information and requires no additional security management. Additionally, the electronic circuit 10 is also provided with a DAC manager/controller 16. A challenge R is entered into the DAC manager 16 from the programming station 110. For example, R may be a random number, contain information of the device identity or be a hash value of such information. If the preceding authentication was successful, as indicated by a signal from the authentication protocol unit 18, the DAC manager 16 generates a response S, e.g. by employing a MAC function. The response S is then transferred by the electronic circuit 10 to the programming station 110. The pair (R, S) constitutes a device access code, DAC, which subsequently can be used by the authorized party to get access to certain circuit capabilities. For example, the DAC can be used by the device manufacturer or other configuring party to make device-specific security data available on an external circuit interface during device configuration, as previously exemplified in FIG. 8.

Given the appropriate trust model, the device manufacturer for example may give/license the DAC to a trusted third party. The DAC may also be used to "re-program" the device, for example replacing compromised security data with new.

Figure 14:
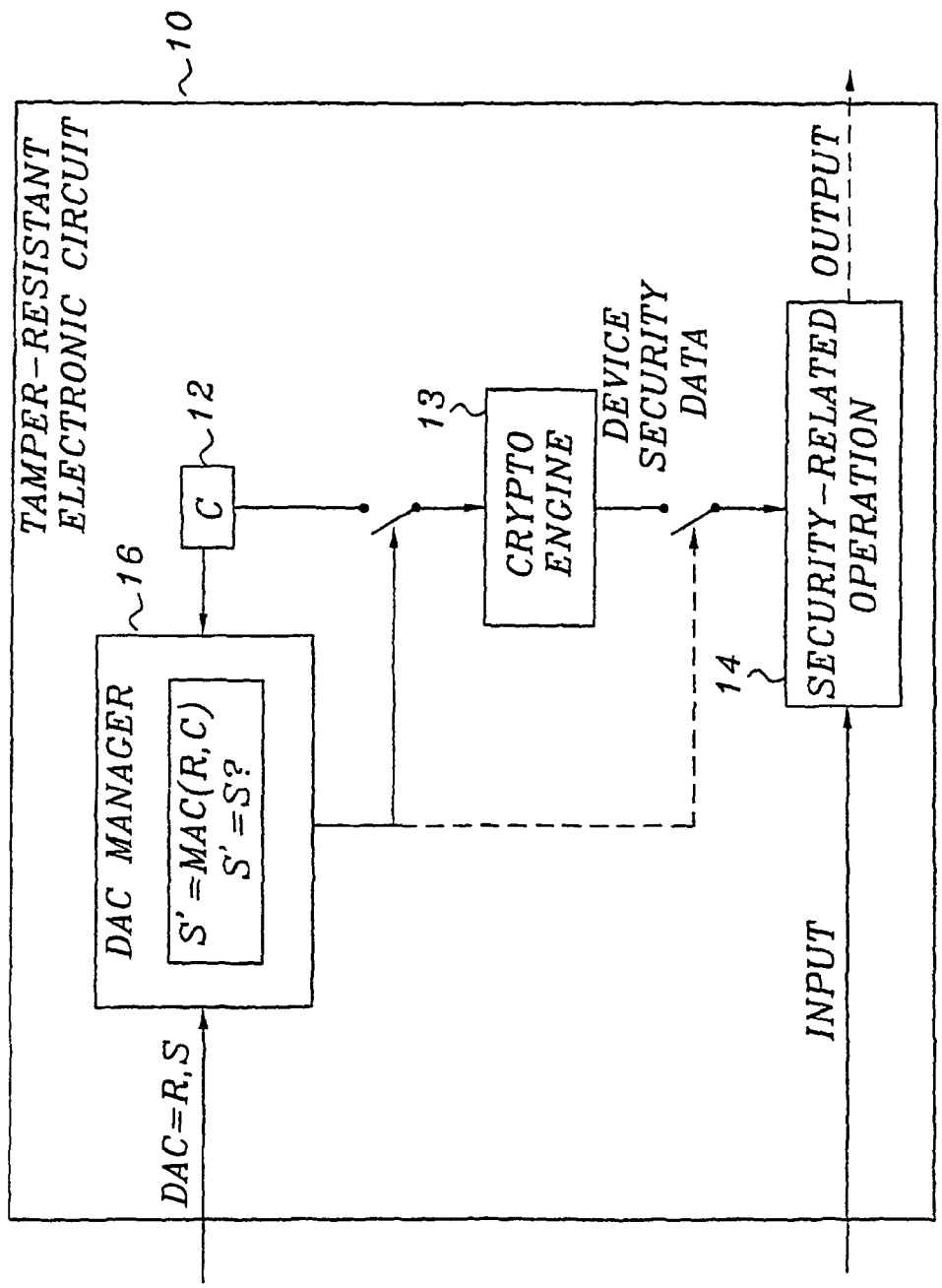
FIG. 14 is a schematic block diagram of an embodiment of an electronic circuit provided with functionality for disabling access to secret data or security data unless the correct device access code is applied to the device access code manager/controller.

As illustrated in FIG. 14, the electronic circuit may also be configured for disabling internal access to the stored secret and/or the device-specific security data, unless a predetermined device access code DAC is entered into the electronic circuit. For example, this can be achieved by arranging a switch in the signal path from the storage unit 12 to the cryptographic engine 13 and/or in the signal path from the cryptographic engine 13 to the security-related operation 14. The switches are typically controlled by a DAC manager/controller 16, which operates in response to a device access code (R, S). For example, the DAC manager 16 could map the received R value into an expected response S' by calculating keyed MAC:

$$S'=MAC(R, C),$$

and then compare the received response S to the calculated expected response S' to verify the device access code (R, S). By default, the switch or switches are open disabling access to the circuit capabilities. Once the correct device access code is entered and verified, the DAC manager/controller 16 closes the switch or switches to enable access to the circuit capabilities.

In this way, it can be ensured that only an authorized party, such as the device manufacturer and/or other party trusted with the device access code, is allowed to use the stored secret for generation of device-specific security data and/or use the security data itself.

The above mechanisms for providing conditional access to circuit capabilities upon authentication are general features of the invention and can be applied to any of the examples given in the present application.

Hierarchy of Bind Keys

The GTD protocol disclosed above can also be iteratively applied, resulting in a chain of shared bind keys. The basic GTD protocol starts with two parties sharing a secret key and ends with one of the initial parties sharing another secret key with a third party. The procedure could be repeated iteratively, involving a fourth party that will, after the second application of the protocol, have a shared secret key with one of the previous parties, and so on for higher order iterates.

Figure 15:
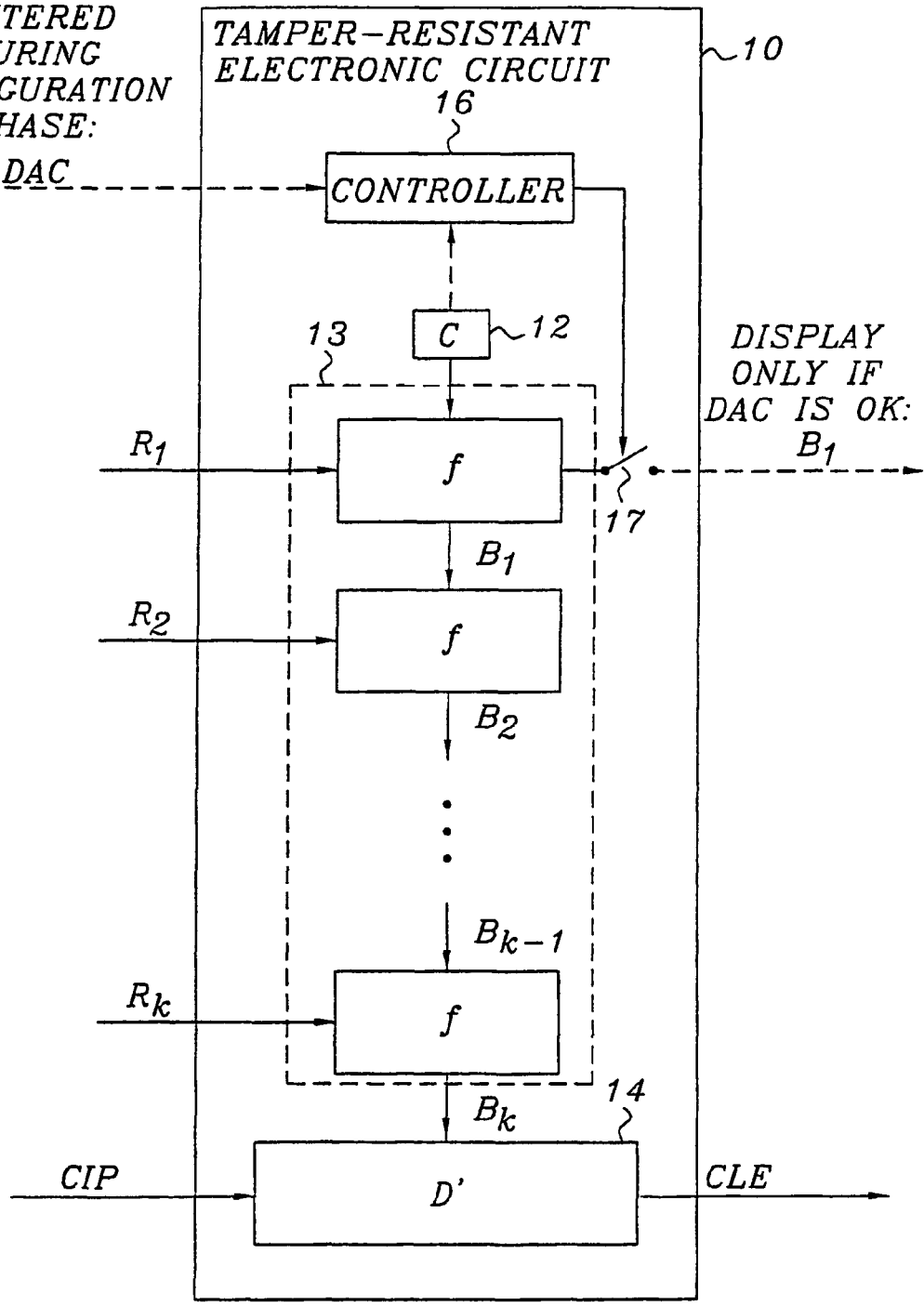
FIG. 15 is a schematic block diagram of a basic embodiment of an electronic circuit configured for generation of a chain of bind keys.

It has been recognized that also the iterated GTD protocol could be implemented entirely within a tamper-resistant electronic circuit, as illustrated in FIG. 15. The cryptographic engine 13 now includes multiple instances of a cryptographic one-way function, f, for producing a chain of k bind keys $B_1, \ldots, B_k$ in response to corresponding bind identities $R_1, \ldots, R_k$ according to the following formula:

$$B_i = f(B_{i-1}, R_i) \text{ for } i=1, \ldots, k,$$

where $B_0 = C$.

The first bind key $B_1$ is typically deduced by the device manufacturer or other configuring party during configuration of the device, for example in a configuration phase during manufacturing, by entering the correct device access code DAC into the DAC controller 16. Once the correct DAC is verified by the controller 16, the switch 17 is closed to enable output of the first bind key $B_1$ outside of the electronic circuit 10. If the correct DAC is not entered, the bind key is unavailable outside the circuit.

By supplying a sequence of bind identities, the device can subsequently calculate the corresponding bind keys and finally perform a security operation, such as decryption of encrypted data CIP into clear text output CLE by means of a decryption algorithm D'. The bind keys are internally confined within the circuit 10, and can not be transferred over an external IC interface by a third party that does not know the device access code. With this implementation an attacker, with physical access to the device, will at most be able to decrypt a given encrypted message, but not get access to the actual bind keys.

Thus we have established, without any security management between circuit manufacturer and device manufacturer, a whole set of device-specific keys ($B_i$, i=1, ..., k) that are available only within the electronic circuit.

Figure 16:
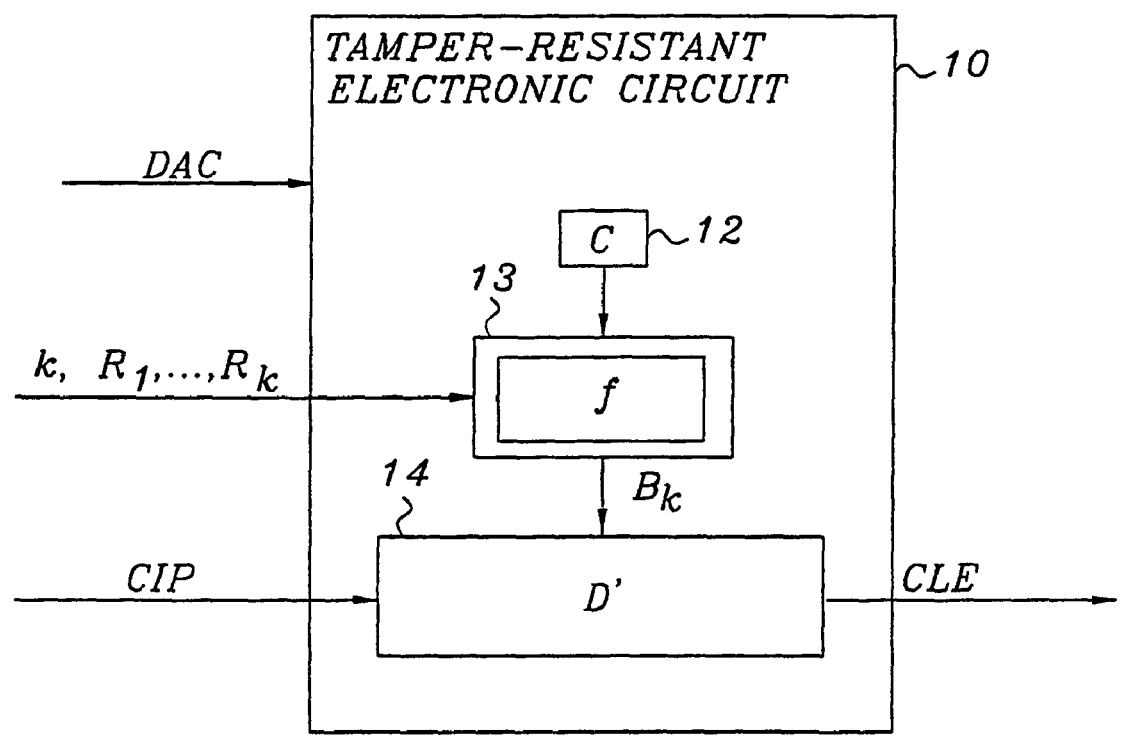
FIG. 16 is a schematic block diagram of another embodiment of an electronic circuit provided with an iterative implementation for generation of a chain of bind keys.

In the realization of FIG. 15, the bind identities $R_1, \ldots, R_k$ are inserted "in parallel". Alternatively, the bind keys may be generated by an "iterative" implementation, as schematically illustrated in FIG. 16. In the example of FIG. 16, the bind identities $R_1, \ldots, R_k$, together with a number k indicating the number of required iterations, are inserted "in serial", e.g. concatenated onto an IC input interface. A built-in algorithm within the electronic circuit 10 then iterates the function f as many times as indicated by the inserted number k, successively processing the relevant inputs ($B_i=f(B_{i-1}, R_i)$ for i=1, ..., k and where $B_0=C$) to output $B_k$ to operation D' or any other suitable security-related operation or algorithm. With this modification, any intermediate bind key can be generated for protected usage with D'. As before, a DAC may be entered to provide external access to the initial bind key.

Managing Security Data to Include Trusted Third Party

In the following, we will focus some more on how to handle security management if a trusted third party wants to communicate securely with the device with or without a user being involved/trusted.

The user being involved/trusted is a common scenario and needs no further explanation. In the DRM setting, however, the user is not trusted as we described previously. In other settings, there may not be a user during normal operation e.g. if the device runs stand-alone. In all cases involving a third party, the third party must access some information to be able to ensure secure communication with the intended device. This information may e.g. be a symmetric key to a device vouched for by a trusted and authorized party or a device-manufacturer-signed device public key certificate used to authenticate a communication entity. We outline two examples in more detail below.

Symmetric Key Delegation to Third Party

Consider the example of FIG. 8. As a particular instance, (R, B) could be a "bind identity"—"bind key" pair, simply referred to as a "bind pair", as in the basic GTD protocol. Thus, one or several bind pairs are generated during configuration, e.g. at device manufacturing, and stored by the configuring party such as the device manufacturer. By an out-of-band arrangement, a trusted third party is in a secure manner delegated one or several bind pairs of this particular device and can then communicate securely with the device, by referring/supplying the bind identities.

The iterated GTD protocol could be achieved analogously to allow a trusted party to further delegate trust to parties that can communicate securely with the device.

Alternatively, a chosen symmetric key K can be used as described in connection with FIG. 6, and the pair (X, K) can be used in the same way as (R, B) above to allow trusted third parties to set up a secure channel to a device.

Public Key Infrastructure

Consider once again the structure exemplified in FIG. 6. Now, assume that K is an asymmetric cryptographic key, e.g. a private key. The following operations could be carried out in a particular secure location, e.g. at the device manufacturer during manufacturing:

A private device decryption key K may be generated together with a public encryption key certificate signed by the device manufacturer's private signature key. The latter key also has a corresponding public key certificate signed by a trusted party, such as a Certification Authority (CA) of a Public Key Infrastructure (PKI), and available for a relevant party to access, see [8]. The key K is fed into the electronic circuit to produce the corresponding X, which may be stored in the device. Subsequently, the private key K may be completely erased at the device manufacturer's domain to prevent any unauthorized usage. The public encryption key certificate may be placed in a publicly available certificate repository. Anyone with access to the public key can later perform encryption of data pertaining to this device. The private decryption key only exists for a short moment in the electronic circuit.

The situation is completely analogous for digital signatures, replacing "decryption" with "signature", and "encryption" with "verification" in the paragraph above, as is known by anyone familiar with the subject.

A similar procedure applies to the realizations described in connection with FIGS. 9-12. There, a private key is already available or generated within the electronic circuit and the corresponding public key is revealed outside the circuit. Thus, the device manufacturer or the user can certify/request certification of this public key and then a third party may use the certificate to enable the desired security operations.

The embodiments described above are merely given as examples, and it should be understood that the present invention is not limited thereto. Further modifications, changes and improvements that retain the basic underlying principles disclosed and claimed herein are within the scope of the invention.

REFERENCES

[1] European Patent Application 0 753 816 A1, published Jan. 15, 1997.
[2] U.S. Pat. No. 6,141,756 issued Oct. 31, 2000.
[3] *Digital Signature Cards Range—Secure smart cards for doing electronic business*, GEMPLUS, printed on Oct. 27, 2003 from http://www.gemplus.com/products/dig_sign_cards_range.
[4] *How PKI can reduce the risks associated with e-business transactions*, by Cannady and Stockton, IBM, Feb. 1, 2001.
[5] *The mechanisms of data security*, printed on Sep. 2, 2003 from http://www.cardsnowindia.com/news/security1.htm.
[6] *Security in an open world*, Skillteam, printed on Sep. 2, 2003 from http://www.common.lu.
[7] *HMAC, Keyed-Hashing for Message Authentication*, RFC 2104 by IETF.
[8] *Handbook of Applied Cryptography*, Menezes, van Oorschot, and Vanstone, Chapters 1, 9 and 12, CRC Press.
[9] U.S. Pat. No. 4,748,668 issued May 31, 1988.

The invention claimed is:

1. A tamper-resistant electronic circuit for implementation in a device, said tamper-resistant electronic circuit comprising:
   a storage device for tamper-resistantly storing, during manufacture of the tamper-resistant electronic circuit, a random secret not accessible over any external circuit interface to the tamper-resistant electronic circuit and unknown after being stored in the storage device;
   trigger data generating circuitry for, during configuration of the tamper-resistant electronic circuit, generating trigger data by cryptographically combining the random secret and device-specific security data that is different from the random secret and outputting the trigger data outside of the tamper-resistant electronic circuit;
   a receiver for, during operation of the configured tamper-resistant electronic circuit by a user, receiving external to the tamper-resistant electronic circuit from the user via an external circuit interface the trigger data;
   a cryptographic processing engine, in response to the externally received trigger data from the user, for performing cryptographic processing at least partly in response to said stored secret and the externally received trigger data from the user to generate a temporarily available instance of the device-specific security data internally confined within said electronic circuit during usage of said device and such that the temporarily available instance of the device-specific security data is only available when the externally received trigger data is received; and
   electronic circuitry, connected to the cryptographic processing engine and configured to perform a security-related operation in response to said internally-confined, temporarily available instance of device-specific security data.

2. The electronic circuit according to claim 1, wherein said device is a network device and said operation is related to at least one of data confidentiality, data integrity, authentication, authorization and non-repudiation in network communication.

3. The electronic circuit according to claim 1, wherein said device is configured for producing digital content and said security-related operation is configured for marking said digital content based on said internally-confined, temporarily available instance of device-specific security data.

4. The electronic circuit according to claim 3, wherein said operation is configured for generating a device-specific fingerprint embedded into said digital content.

5. The electronic circuit according to claim 1, said electronic circuit is configured to:
   generate, based on said stored secret and said configurational device-specific security data, said trigger data as a cryptographic representation of said configurational device-specific security data during configuration of said device;
   output said cryptographic representation over an external circuit interface during configuration; and
   re-generate said device-specific security data during usage of said device provided that said additional input corresponds to said cryptographic representation.

6. The electronic circuit according to claim 5, wherein said internally re-generating said device-specific security data comprises generating a private key at least partly based on said stored secret, and said trigger data is generated as a cryptographic representation of said private key during configuration of said device.

7. The electronic circuit according to claim 1, further configured to make, during configuration of said device, said internally-confined, temporarily available instance of device-specific security data available over the external circuit interface provided that a predetermined device access code is entered into the electronic circuit.

8. The electronic circuit according to claim 7, further configured to:
   authenticate a manufacturer of said device;
   provide, during device manufacturing, said device access code to said device manufacturer in response to successful authentication.

9. The electronic circuit according to claim 1, further configured to internal access to at least one of said stored secret and said device-specific security data unless a predetermined device access code is entered into the electronic circuit.

10. The electronic circuit according to claim 1, wherein said electronic circuitry is configured to:
    perform additional cryptographic processing based on said internally-confined, temporarily available instance of the device-specific security data and further external input data to generate further security data; and
    perform said security-related operation in response to said further security data.

11. The electronic according to claim 10, wherein said device-specific security data represents a private key, and said further external input data represents an encryption of said further device-specific security data by the corresponding public key.

12. The electronic circuit according to claim 11, wherein said further security data represents a symmetric content decryption key issued by a content provider, and said device-specific security data represents a private key of a device manufacturer.

13. The electronic circuit according to claim 1, wherein said cryptographic processing engine is configured for generating a symmetric cryptographic key in response to a seed applied over an external circuit interface.

14. The electronic circuit according to claim 1, wherein said cryptographic processing engine is configured for generating an internally-confined, temporarily available private key at least partly based on said stored secret, and said electronic circuitry comprises means for performing asymmetric cryptography operations based on said internally confined, temporarily available private key.

15. The electronic circuit according to claim 14, further configured to:
    perform shared key generation to generate a new shared key based on said generated private key and a public key of an intended communication partner; and
    perform cryptographic processing based on said new shared key.

16. The electronic circuit according to claim 14, further configured to:
    generate a public key corresponding to said private key during configuration of said device, and
    output said public key over an external circuit interface.

17. The electronic circuit according to claim 1, wherein said cryptographic processing engine is configured for generating said internally-confined, temporarily available instance of device-specific security data as a chain of k bind keys $B_1, \ldots, B_k$ in response to corresponding bind identities $R_1, \ldots, R_k$ according to the following formula:

$$B_i = f(B_{i-1}, R_i) \text{ for } i=1, \ldots, k,$$

where $B_0$ represents the stored secret, and f is a cryptographic one-way function.

18. A device implemented with a tamper-resistant electronic circuit, said electronic circuit comprising:
- a storage unit for tamper-resistantly storing, during manufacture of the tamper-resistant electronic circuit, a random secret not accessible over any external circuit interface to the tamper-resistant electronic circuit and unknown after being stored in the storage device;
- trigger data generating circuitry for, during configuration of the tamper-resistant electronic circuit, generating trigger data by cryptographically combining the random secret and device-specific security data that is different from the random secret and outputting the trigger data outside of the tamper-resistant electronic circuit;
- a receiver for, during operation of the configured tamper-resistant electronic circuit by a user, receiving external to the tamper-resistant electronic circuit from the user via an external circuit interface the trigger data;
- a cryptographic processing engine, in response to the externally received trigger data from the user, for performing cryptographic processing at least partly in response to said stored secret and the externally received trigger data from the user to generate a temporarily available instance of the device-specific security data internally confined within said electronic circuit during usage of said device such that the temporarily available instance of the device-specific security data is only available when the externally received trigger data is received; and
- electronic circuitry, connected to the cryptographic processing engine and configured to perform a security-related operation in response to said internally-confined, temporarily available instance of device-specific security data.

19. The device according to claim 18, wherein said device is a network device and said operation is related to at least one of data confidentiality, data integrity, authentication, authorization and non-repudiation in network communication.

20. The device according to claim 18, wherein said device is configured for producing digital content and said security-related operation is configured for marking said digital content based on said device-specific security data.

21. The device according to claim 18, wherein said cryptographic processing engine is configured for generating said internally-confined, temporarily available instance of device-specific security data provided that additional input data in the form of predetermined trigger data is applied over an external circuit interface of the electronic circuit during usage of said device, wherein said trigger data is defined during configuration of said device.

22. A method for a device, said method comprising the steps of:
- storing, in a controlled environment during manufacturing of a tamper-resistant electronic circuit, a secret randomized number in said electronic circuit such that the secret randomized number is not available outside of said tamper-resistant electronic circuit and is unknown after being stored in the storage device;
- during configuration of the tamper-resistant electronic circuit, generating trigger data by cryptographically combining the secret randomized number and device-specific security data that is different from the secret randomized number and outputting the trigger data outside of the tamper-resistant electronic circuit;
- implementing, during circuit manufacturing, functionality into said electronic circuit for, during operation of the configured tamper-resistant electronic circuit by a user, receiving external to the tamper-resistant electronic circuit from the user via an external circuit interface the trigger data;
- implementing, during circuit manufacturing, functionality into said electronic circuit for, in response to the externally-received trigger data from the user, performing cryptographic processing at least partly based on said stored secret number and the externally-received trigger data from the user to generate a temporarily available instance of the device-specific security data internally confined within said electronic circuit during usage of the device such that the temporarily available instance of the device-specific security data is only available when the externally received trigger data is received;
- implementing, during circuit manufacturing, a security-related operation into said electronic circuit, said security-related operation being configured for receiving at least said internally-confined, temporarily available instance of device-specific security data as input during usage of the device; and
- installing, during device manufacturing, said electronic circuit into said device.

23. The method according to claim 22, wherein said device is a network device and said operation is related to at least one of data confidentiality, data integrity, authentication, authorization and non-repudiation in network communication.

24. The method according to claim 22, wherein said device is configured for producing digital content and said security-related operation is configured for marking said digital content based on said internally-confined temporarily available instance of device-specific security data.

25. The method according to claim 22, further comprising the step of providing, during configuration of the device, trigger data to be applied later during usage of the device in order to be able to generate said internally-confined temporarily available instance of device-specific security data within said electronic circuit.

26. The method according to claim 25, further comprising the steps of:
- entering, in a controlled environment during device configuration, said trigger data as input data into said electronic circuit in order to obtain device-specific security data from the cryptographic functionality of the electronic circuit;
- recording, in a controlled environment during device configuration, said device-specific security data and said input data; and
- entering, in a controlled environment during device configuration, a predetermined device access code into the electronic circuit for accessing the internally-confined temporarily available instance of device-specific security data over an external circuit interface.

27. The method according to claim 25, further comprising the steps of:
- generating, in a controlled environment during device configuration, an internally-confined temporarily available instance of device-specific security data;
- entering, in a controlled environment during device configuration, said generated device-specific security data into said electronic circuit in order to obtain said trigger data as a result representation from the cryptographic functionality of the electronic circuit; and
- recording, in a controlled environment during device configuration, said result representation and the previously generated device-specific security data.

* * * * *

UNITED STATES PATENT AND TRADEMARK OFFICE
CERTIFICATE OF CORRECTION

| | | |
|---|---|---|
| PATENT NO. | : 7,861,097 B2 | Page 1 of 1 |
| APPLICATION NO. | : 10/533120 | |
| DATED | : December 28, 2010 | |
| INVENTOR(S) | : Smeets et al. | |

It is certified that error appears in the above-identified patent and that said Letters Patent is hereby corrected as shown below:

Title Page 2, in Field (56), under "OTHER PUBLICATIONS", in Column 2, Line 29, delete "Multimeda" and insert -- Multimedia --, therefor.

In Column 2, Line 3, delete "device" and insert -- device, --, therefor.

In Column 4, Line 45, delete "fill" and insert -- full --, therefor.

In Column 8, Line 62, delete "confidentiality" and insert -- confidentiality, --, therefor.

In Column 10, Line 27, delete "circuit" and insert -- circuit. --, therefor.

In Column 13, Line 20, delete "requited" and insert -- required --, therefor.

In Column 14, Line 50, delete "I2" and insert -- K2 --, therefor.

In Column 15, Line 24, delete "fusing" and insert -- f using --, therefor.

In Column 22, Line 9, delete "manufacturing:" and insert -- manufacturing. --, therefor.

In Column 23, Line 50, in Claim 5, delete "1, said" and insert -- 1, wherein said --, therefor.

In Column 23, Line 53, in Claim 5, delete "device- specific" and insert -- device-specific --, therefor.

In Column 24, Line 25, in Claim 11, delete "electronic according" and insert -- electronic circuit according --, therefor.

Signed and Sealed this
Thirtieth Day of August, 2011

David J. Kappos
*Director of the United States Patent and Trademark Office*